(12) United States Patent
Ford

(10) Patent No.: US 12,303,052 B2
(45) Date of Patent: May 20, 2025

(54) SYSTEMS, METHODS AND APPARATUS FOR PLANTER FRAME

(71) Applicant: Dan Ford, Allen, TX (US)

(72) Inventor: Dan Ford, Allen, TX (US)

(*) Notice: Subject to any disclaimer, the term of this patent is extended or adjusted under 35 U.S.C. 154(b) by 0 days.

(21) Appl. No.: 18/348,779

(22) Filed: Jul. 7, 2023

(65) Prior Publication Data

US 2023/0346143 A1 Nov. 2, 2023

Related U.S. Application Data

(63) Continuation-in-part of application No. 16/900,889, filed on Jun. 13, 2020, now Pat. No. 11,696,655.

(51) Int. Cl.
A47G 7/04 (2006.01)

(52) U.S. Cl.
CPC ................... A47G 7/045 (2013.01)

(58) Field of Classification Search
CPC .......... A01G 9/024; A01G 9/026; A01G 9/02; A01G 9/022; A47G 7/045; A47G 7/042
See application file for complete search history.

(56) References Cited

U.S. PATENT DOCUMENTS

| | | | | |
|---|---|---|---|---|
| 112,433 A * | 3/1871 | Eastman | ........... | A01G 9/02 47/65.5 |
| 936,619 A * | 10/1909 | Foy | ........... | A01G 9/022 211/74 |
| 1,190,147 A * | 7/1916 | Gloede | ........... | A01G 9/022 47/39 |
| 1,826,547 A * | 10/1931 | Jackson | ........... | A01G 9/02 47/41.13 |
| 2,573,770 A * | 11/1951 | Meadow | ........... | A45C 3/06 220/489 |
| 2,812,098 A * | 11/1957 | Escaut | ........... | A47J 43/24 220/489 |
| 2,945,323 A * | 7/1960 | Pratt | ........... | A01G 9/02 47/77 |
| 5,967,360 A * | 10/1999 | Cheng-Tien | ........... | A47G 7/047 220/489 |
| 7,340,859 B2 * | 3/2008 | Palsrok | ........... | A01G 9/022 248/167 |
| 2003/0024160 A1* | 2/2003 | Hendrickson | ........... | A01G 9/024 47/67 |
| 2006/0005466 A1* | 1/2006 | Atchley | ........... | A01G 9/024 47/39 |

(Continued)

*Primary Examiner* — Monica L Perry
*Assistant Examiner* — Aaron M Rodziwicz
(74) *Attorney, Agent, or Firm* — James A. Sheridan; Sheridan Law, LLC

(57) ABSTRACT

A frame to hold a first planter in a second platter. In an embodiment, a frame includes a pair of U-shaped members coupled to one another, in which each respective U-shaped member includes a first and second vertical member projecting upward from opposing ends of a cross-member to a first and second hanger, respectively, and each respective hanger is configured to be removably coupled to a rim of the second planter. The pair of U-shaped members can be coupled to one another at a center position of the respective cross-members, forming an interior volume configured to receive the first planter. In an embodiment, a frame includes a removable ring configured to extend circumferentially around the frame and contact the first and second vertical member of each respective U-shaped member.

20 Claims, 19 Drawing Sheets

(56) References Cited

U.S. PATENT DOCUMENTS

| | | | |
|---|---|---|---|
| 2006/0112633 A1* | 6/2006 | Humphrey | A47G 7/041 47/66.6 |
| 2009/0158653 A1* | 6/2009 | Oliver | A01G 9/024 47/66.2 |
| 2009/0206046 A1* | 8/2009 | Lunato | A01G 9/02 211/85.18 |
| 2015/0238028 A1* | 8/2015 | Moskowitz | A47G 7/02 248/27.8 |
| 2018/0110189 A1* | 4/2018 | Smith | A47G 7/047 |

* cited by examiner

SYSTEMS, METHODS AND APPARATUS FOR PLANTER FRAME

CROSS-REFERENCE TO RELATED APPLICATIONS

This application is a continuation-in-part of U.S. patent application Ser. No. 16/900,889 filed Jun. 13, 2020, the content of which is relied upon and incorporated herein by reference in its entirety, and the benefit of priority under 35 U.S.C. § 120 is hereby claimed.

FIELD

This disclosure relates generally to planters, and more particularly to flowerpots (Jardinieres), containers, cachepots, window boxes (a planter attached to a windowsill), sub-irrigated planters, tubs, urns, patio planters, plant pots, pots, and flower planters.

BACKGROUND

Conventional planters typically have a much larger volume of dirt than is required to properly cultivate the plant(s) in the planter. The interior volume of the planters is typically much larger than the amount of dirt that is required to cultivate the plant. However, the conventional way to cultivate a plant in a conventional planter is to fill the interior of the planter with dirt, and then plant the plant in the top portion of the dirt at the top of planter. A considerable amount of the dirt below the plant is never utilized by the plant. The additional amount of the dirt below the plant adds expense and needless deadweight to the planter. The deadweight can often make moving the planter quite a lot more difficult, if not impossible to move, by a single individual human. The deposit of the plant in the top of the dirt in the planter also requires that to move the plant, the plant must be dug-out of the planter, thus the plant can be difficult to move, or downright immobile.

SUMMARY

The above-mentioned shortcomings, disadvantages and problems are addressed herein, which will be understood by reading and studying the following specification.

Apparatus, systems, and methods of varying scope are described herein. In addition to the aspects and advantages described in this summary, further aspects and advantages will become apparent by reference to the drawings and by reading the detailed description that follows.

In various embodiments, a frame to hold a first planter in a second planter is provided, the frame comprising: a pair of U-shaped members coupled to one another, wherein each respective U-shaped member comprises a first and second vertical member projecting upward from opposing ends of a cross-member to a first and second hanger, respectively, wherein each respective hanger is configured to be removably coupled to a rim of the second planter; wherein the pair of U-shaped members are coupled to one another at a center position of the respective cross-members, forming an interior volume configured to receive the first planter; and a removable first ring configured to extend circumferentially around the frame and contact the first and second vertical member of each respective U-shaped member.

In some embodiments, for each respective U-shaped member, the first and second hangers, the first and second vertical members, and the cross-member are integrally formed from a single piece of material.

In some embodiments, for each respective U-shaped member, the first and second hangers are removably coupled to the respective first and second vertical members.

In some embodiments, the first and second vertical members of each respective U-shaped member comprises a protrusion, wherein the protrusion is configured to receive the first ring. In some embodiments, the protrusion has a zigzag shape.

In some embodiments, the first and second vertical members of each respective U-shaped member comprises two or more protrusions, wherein each respective protrusion is configured to receive the first ring, and wherein the two or more protrusions are spaced apart from one another. In some embodiments, each of the two or more protrusions has a zigzag shape.

In some embodiments, the pair of U-shaped members are pivotably coupled to one another at the center position of their respective cross-members, whereby the pair of U-shaped members can pivot about the center position such that the respective first and second vertical members of the pair of U-shaped members can be variably spaced apart from one another.

In some embodiments, the pair of U-shaped members includes a first U-shaped member and a second U-shaped member; wherein the hangers, the first and second vertical members, and the cross-member of the first U-shaped member collectively form a first vertical plane; wherein the hangers, the first and second vertical members, and the cross-member of the second U-shaped member collectively form a second vertical plane; and wherein the first and second U-shaped members can pivot about the center position of the respective cross-members such that the first and second vertical planes are in an overlapping or non-overlapping position relative to one another.

In some embodiments, the pair of U-shaped members are pivotably coupled to one another at the center position of their respective cross-members, such that the respective first and second vertical members of the pair of U-shaped members can be in the same vertical plane as one another.

In some embodiments, the first and second vertical planes are in the overlapping position for shipping and storage and in the non-overlapping position for holding the first planter in the second planter.

In various embodiments, a method of removably coupling a frame to a first planter, the frame configured to hold a second planter inside the first planter, is provided. The method comprising: providing the frame, comprising: a pair of U-shaped members coupled to one another, wherein each respective U-shaped member comprises a first and second vertical member projecting upward from opposing ends of a cross-member to a first and second hanger, respectively, wherein each respective hanger is configured to be removably coupled to a rim of the second planter; wherein the pair of U-shaped members are coupled to one another at a center position of the respective cross-members, forming an interior volume configured to receive the first planter; and pivotably rotating the pair of U-shaped members about the center position such that the respective first and second vertical members of the pair of U-shaped members are spaced apart from one another; inserting a removable first ring into the pair of U-shaped members, wherein the first ring extends circumferentially around the frame and contacts the first and second vertical member of each respective U-shaped member; and inserting the frame inside the first planter such that each respective hanger is removably coupled to the rim of the first planter.

In some embodiments, the method further comprises laying the second planter on the X-shaped bottom formed by the cross-members of the pair of U-shaped members.

In some embodiments, the first and second vertical member of each respective U-shaped member comprises one or more protrusions configured to receive the first ring.

In some embodiments, the first and second vertical member of each respective U-shaped member comprises two or more protrusions configured to receive the first ring, the two or more protrusions being spaced apart between the hanger of each respective first and second member and the respective cross-members.

In some embodiments, the inserting the first ring into the pair of U-shaped members comprises inserting the first ring into a protrusion of the two or more protrusions, whereby inserting the first ring into the protrusion defines an inverted and truncated conical volume configured to receive the first planter.

In some embodiments, each of the U-shaped members and the removable first ring are comprised of metal wire.

In some embodiments, the removable first ring contacts the vertical members of the U-shaped members at a position between the cross-member and the first and second hangers of each respective vertical member.

In some embodiments, the frame further comprises a removable second ring.

In some embodiments, the removable second ring frame is configured to extend circumferentially around the frame and contact the first and second vertical member of each respective U-shaped member at a position adjacent to the cross-member.

In some embodiments, the first and second vertical members each comprise a first protrusion between the cross-member and the first and second hangers of each respective vertical member, the first protrusion configured to receive the first ring.

In some embodiments, each of the U-shaped members comprises a second protrusion where the respective vertical members project upward from the corresponding cross-member, the second protrusion configured to receive a removable second ring.

In various embodiments, a frame to hold a first planter in a second planter is provided, the frame comprising: a pair of U-shaped members coupled to one another, each respective U-shaped member comprising: two hangers at opposing ends of the U-shaped member; two vertical members, each respective vertical member being attached to one of the two hangers at a first end of the vertical member; and a cross-member attached to a second end of the each of the vertical members; wherein each of the respective hangers comprises a hook configured to be removably coupled to a mouth of the second planter; wherein the pair of U-shaped members are coupled to one another at a center position of the respective cross-members, forming an inverted and truncated conical volume configured to receive the first planter; and a removable first ring configured to extend circumferentially around the frame and contact the vertical members of each respective U-shaped member; wherein the removable first ring is sized and configured to expand a diameter of the inverted and truncated conical volume defined by the pair of U-shaped members.

In some embodiments, the respective cross-members intersect each other in a center position of the U-shaped members.

In some embodiments, the removable first ring contacts the vertical members of the U-shaped members at a position between the first end and the second end of each respective vertical member.

In some embodiments, each of the hangers is integrated with one of the vertical members.

In some embodiments, the frame further comprises a removable second ring configured to extend circumferentially around the frame and contact the vertical members of each respective U-shaped member; wherein the removable second ring is configured to contact each of the vertical members at a position adjacent to the cross-members.

In some embodiments, each of the hangers, vertical members, cross-members, and first ring are comprised of metal wire.

In some embodiments, an interior geometric size and an interior shape of the frame is larger than an exterior geometric size and an exterior shape of the first planter.

In some embodiments, the interior geometric size and the interior shape of the frame is approximately the exterior geometric size and the exterior shape of the first planter.

In some embodiments, each of the respective vertical members of the U-shaped members comprises a first protrusion between the first and second ends of each respective vertical member, the first protrusion configured to receive the removable first ring.

In some embodiments, each of the U-shaped members comprises a second protrusion where the respective vertical members contact the corresponding cross-member, the protrusion configured to receive the removable second ring.

In various embodiments, a frame to hold a first planter in a second planter, the frame comprising: a pair of U-shaped members coupled to one another, wherein each respective U-shaped member comprises a first and second vertical member projecting upward from opposing ends of a cross-member to a first and second hanger, respectively, wherein each of the first and second hangers comprises a hook-shaped head extending away from the cross-member, and each respective hanger is configured to be removably coupled to a rim of the second planter; wherein the pair of U-shaped members are coupled to one another at a center position of the respective cross-members, forming an X-shaped bottom and a truncated conical volume configured to receive the first planter; and a removable first ring configured to extend circumferentially around the frame and contact the first and second vertical member of each respective U-shaped member.

In some embodiments, each of the U-shaped members and the removable first ring are comprised of metal wire.

In some embodiments, the removable first ring contacts the vertical members of the U-shaped members at a position between the cross-member and the first and second hangers of each respective vertical member.

In some embodiments, the frame further comprises a removable second ring.

In some embodiments, the removable second ring frame is configured to extend circumferentially around the frame and contact the first and second vertical member of each respective U-shaped member at a position adjacent to the cross-member.

In some embodiments, the first and second vertical members each comprise a protrusion between the cross-member and the first and second hangers of each respective vertical member, the protrusion configured to receive the first ring.

In some embodiments, each of the U-shaped members comprises a second protrusion where the respective vertical members project upward from the corresponding cross-member, the second protrusion configured to receive the removable second ring.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

The drawings are not necessarily to scale, and certain features and certain views of the drawings may be shown exaggerated in scale or in schematic in the interest of clarity and conciseness.

DETAILED DESCRIPTION

In the following detailed description, reference is made to the accompanying drawings that form a part hereof, and in which is shown by way of illustration specific embodiments which may be practiced. The various embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

In various embodiments, as shown FIGS. 1-14 and 17-20, a planter apparatus (also referred to as a frame) configured to hold a first planter in a second planter is disclosed. In various embodiments, as shown FIGS. 15 and 16, a method of assembling the frame is disclosed.

Figure 1:
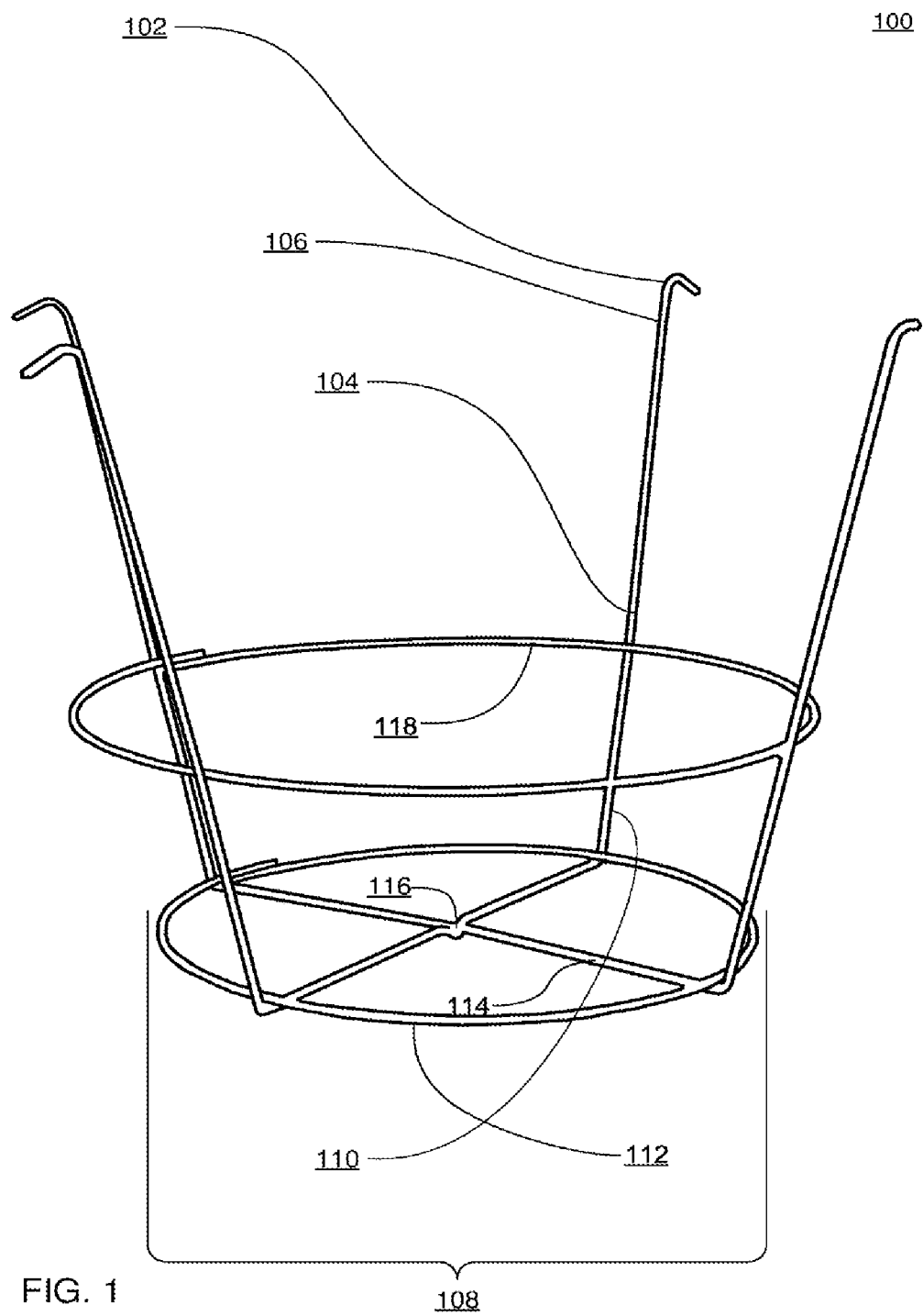
FIG. 1 is an isometric diagram of an overview of a planter apparatus, in accordance with embodiments described herein.

FIG. 1 is an isometric diagram of an overview of a planter apparatus 100. Planter apparatus 100 provides a means of containing and holding a smaller planter in a larger planter, and a means of transporting the smaller planter to a second larger planter.

Planter apparatus 100 is a frame to hold a first planter in a second planter in which the frame includes at least two hangers 102 and at least two vertical members 104, each of the vertical members 104 attached to at least one of the hangers 102 on a first (upper) end 106 of the vertical members 104, and a bottom 108 is attached to a second (lower) end 110 of the each of the vertical members 104.

In some embodiments of planter apparatus 100, each of the hangers 102 further comprises a hook that is curved away and downward from the first end 106 of the vertical members 104 (as shown in FIG. 1). In some embodiments, the hook extends away from the bottom 108. In some embodiments, the hook extends away an internal volume defined by the at least two vertical members 104 and the bottom 108, the internal volume configured to receive a smaller planter.

In some embodiments of planter apparatus 100, each of the hooks is configured to removably and/or releasably couple to the rim of the mouth of the second planter (not shown in FIG. 1).

In some embodiments of the planter apparatus 100, the bottom 108 further comprises a first ring 112 (bottom ring)

along a horizontal plane and the bottom 108. In some embodiments, the first ring 112 shown in FIGS. 4-8 is an outer compression ring. Some embodiments of the planter apparatus 100 further comprise additional structure in the horizontal plane, wherein the additional structure further comprises at least one cross-member 114 (as shown in FIG. 1).

In some embodiments of the planter apparatus 100, the at least one cross-member 114 further comprises two equilateral cross-members that intersect each other in a center 116 of the bottom 108 (as shown in FIG. 1). In some embodiments, the cross-members form an X-shaped bottom structure. During use, a planter can be set down on the x-shaped bottom formed by the cross-members.

In some embodiments of the planter apparatus 100, the at least two hangers 102 comprises four hangers 102 (as shown in FIG. 1) and the at least two vertical members 104 comprises four vertical members 104 (as shown in FIG. 1).

In some embodiments of the planter apparatus 100, each of the hangers 102 is integral (formed from one piece of material) with one of the vertical members 104 (as shown in FIG. 1). For round planters, the planter apparatus 100 includes at least three vertical members 104 because having only two vertical members 104 is more susceptible to swaying from side-to-side from sideways bumps or jolts. In some embodiments, one or more of the hangers 102 is an attachable hanger 103 (not formed from one piece of material with the vertical member) as shown in FIGS. 4-7. In such embodiments, each of the respective hangers 103 is permanently or removably coupled to a vertical member 104. For example, the hanger 103 can include a receiving hole configured to receive the first end 106 of the vertical member. In some embodiments, the hanger 103 is made of plastic and the vertical member is made of metal wire. In some embodiments, the hanger 103 is the hook configured to removably and/or releasably couple to the rim of the mouth of a planter.

In some embodiments of the planter apparatus 100, the frame further comprises at least one middle ring 118 that further comprises second ring along the horizontal plane and each middle ring is attached to each of the vertical members 104, which can be used to expand the radius and diameter of the hook pattern, or can be used to compress to fit smaller openings.

In some embodiments of the planter apparatus 100, the hangers 102, the vertical members 104, the bottom 108 and the middle ring 118 are independently formed from metal wire (as shown in FIG. 1), plastic, or any functionally equivalent weight-bearing material. In some embodiments of the planter apparatus 100, the hangers 102, the vertical members 104, the bottom 108 and the middle ring 118 are formed out of plastic. In some embodiments of the planter apparatus 100, the hangers 102, the vertical members 104, the bottom 108 and the middle ring 118 are formed out of metal wire.

In some embodiments of the planter apparatus 100, an interior geometric size and an interior shape of the frame is larger than an exterior geometric size and an exterior shape of the first planter. As such, the first planter can be set down inside of the internal volume created by the planter apparatus 100.

In some embodiments of the planter apparatus 100, the interior geometric size and the interior shape of the frame is approximately the exterior geometric size and the exterior shape of the first planter.

In some embodiments, such as shown in FIG. 1, distal vertical members 104 and cross-members of the bottom 108 are formed from singular pieces of material, such as metal wire (as shown in FIG. 1). In the example of FIG. 1, two distal vertical members 104 and one cross-member of the bottom 108 are formed from a singular piece of material, such as metal wire and another two distal vertical members 104 and one cross-member 114 of the bottom 108 are formed from another singular piece of material, such as metal wire (as shown in FIG. 1). In some embodiments, two vertical members 104 and a cross-member 114 positioned between and connecting the two vertical members (at the second end of the respective vertical members) form a U-shaped member 101.

In some embodiments, a pair of U-shaped members 101 are coupled to one another, wherein each respective U-shaped member 101 comprises a first and second vertical member 104 projecting upward from opposing ends of a cross-member to a first and second hanger, respectively. In some embodiments, each of the first and second hangers comprises a head or hook extending away from the cross-member, and each respective head or hook is configured to be removably coupled to a rim of the second planter. In some embodiments, the pair of U-shaped members are coupled to one another at a center position of the respective cross-members, forming an X-shaped bottom and a truncated conical volume configured to receive a planter.

Planter apparatus 100 provides a means of containing and holding a smaller planter in a larger planter, and provides a means of transporting the smaller planter to a second larger planter because the smaller planter can be removed by lifting the planter apparatus 100 by the hangers 102, thereby lifting the smaller planter in the planter apparatus 100 from the larger planter, and thereafter the planter apparatus 100 and the smaller planter in the apparatus can be easily transported to another larger planter without having to dig out the plant from the larger planter.

While the planter apparatus 100 is not limited to any particular hangers 102, vertical members 104, first side 106, a bottom 108, second side 110 of the each of the vertical members 104, first ring 112, one cross-member 114, center 116 of the bottom 108 and middle ring 118, for sake of clarity simplified hangers 102, vertical members 104, first side 106, a bottom 108, second side 110 of the each of the vertical members 104, first ring 112, one cross-member 114, center 116 of the bottom 108 and middle ring 118 are described.

Figure 2:
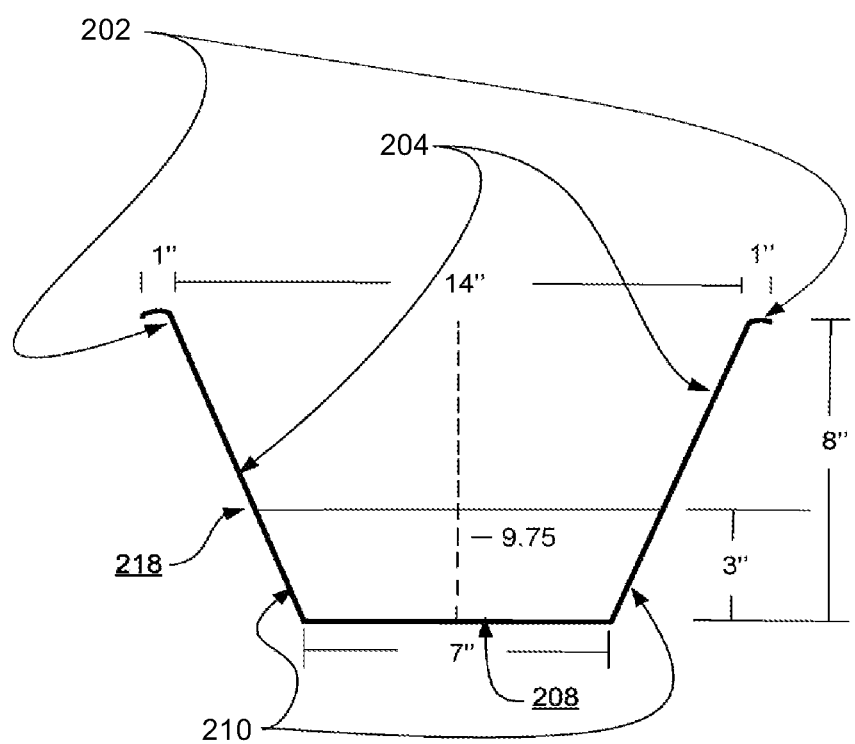
FIG. 2 is a side view of a weight-bearing member of a planter apparatus according to an embodiment for holding a 1-gallon planter.

FIG. 2 is a diagram of a planter apparatus 200 for holding a 1-gallon planter. Planter apparatus 200 provides a means of containing and holding a smaller planter (1 gallon volume having dimension of 7" tall and 6.25" top diameter) in a larger planter, and that provides a means of transporting the smaller planter to the second larger planter. The smaller planter and the larger planter are not shown in FIG. 2.

Planter apparatus 200 is a frame that includes at least two hangers 202 and at least two vertical members 204. Each of the hangers 202 is integral (formed from one piece of material) with one of the vertical members 204 (as shown in FIG. 2). In some embodiments of the planter apparatus 200, each of the hangers 202 further comprise a hook that is curved away and downward from the first side 206 of the vertical members 204 (as shown in FIG. 2). In some embodiments of the planter apparatus 200, each of the hooks is configured to be removably coupled to the rim of a mouth of the second planter (not shown in FIG. 2).

A bottom 208 is attached to a second (lower) end 210 of the each of the vertical members 204. In some embodiments, the bottom 208 comprises a first ring (not shown in FIG. 2) along a horizontal plane and the bottom 208 further comprises additional structure in the horizontal plane, wherein the additional structure comprises at least one cross-member (not shown in FIG. 2). The at least one cross-member further comprises two equilateral cross-members that intersect each other in a center of the bottom 208 (not shown in FIG. 2), forming an X-shaped bottom and, with the vertical members a truncated conical volume configured to receive a planter.

In some embodiments of the planter apparatus 200, the at least two hangers 202 comprises four hangers 202 (not shown in FIG. 2) and the at least two vertical members 204 comprises four vertical members 204 (as shown in FIG. 2).

In some embodiments of the planter apparatus 200, the frame further comprises at least one middle ring 218 that forms a second ring (not shown in FIG. 2) along the horizontal plane; and each middle ring 218 is in contact with (attached or removably coupled to) each of the vertical members 204, which can be used to expand the radius and diameter of the hook pattern, or can be used to compress to fit smaller openings.

In some embodiments of the planter apparatus 200, the hangers 202, the vertical members 204, the bottom 208 and the middle ring 218 are independently made of metal wire (as shown in FIG. 2) or plastic; or compressed to fit smaller openings.

In some embodiments of the planter apparatus 200, an interior geometric size and an interior shape of the frame is larger than an exterior geometric size and an exterior shape of the smaller planter. In some embodiments of the planter apparatus 200, the interior geometric size and the interior shape of the frame is approximately the exterior geometric size and the exterior shape of the smaller planter.

In some embodiments, (not shown in FIG. 2), vertical members 204 and cross-members of the bottom 208 are formed from singular pieces of material, such as metal wire or plastic. Two distal vertical members 204 and one cross-member of the bottom 208 are formed from a singular piece of material, such as metal wire or plastic and another two distal vertical members 204 and one cross-member of the bottom 208 are formed from another singular piece of material (not shown in FIG. 2), such as metal wire or plastic. In some embodiments, two vertical members and a cross-member connecting the two vertical members at the second end of the respective vertical members form a U-shaped member.

Planter apparatus 200 provides a means of containing and holding a smaller planter (1-gallon volume having dimension of 7" tall and 6.25" top diameter) in a larger planter, and a means of transporting the smaller planter to a second larger planter because the smaller planter can be removed by lifting the planter apparatus 200 by the hangers 202, thereby lifting the smaller planter in the planter apparatus 200 from the larger planter, and thereafter the planter apparatus 200 and the smaller planter in the apparatus can be easily transported to another larger planter without having to dig out the plant from the larger planter.

Figure 3:
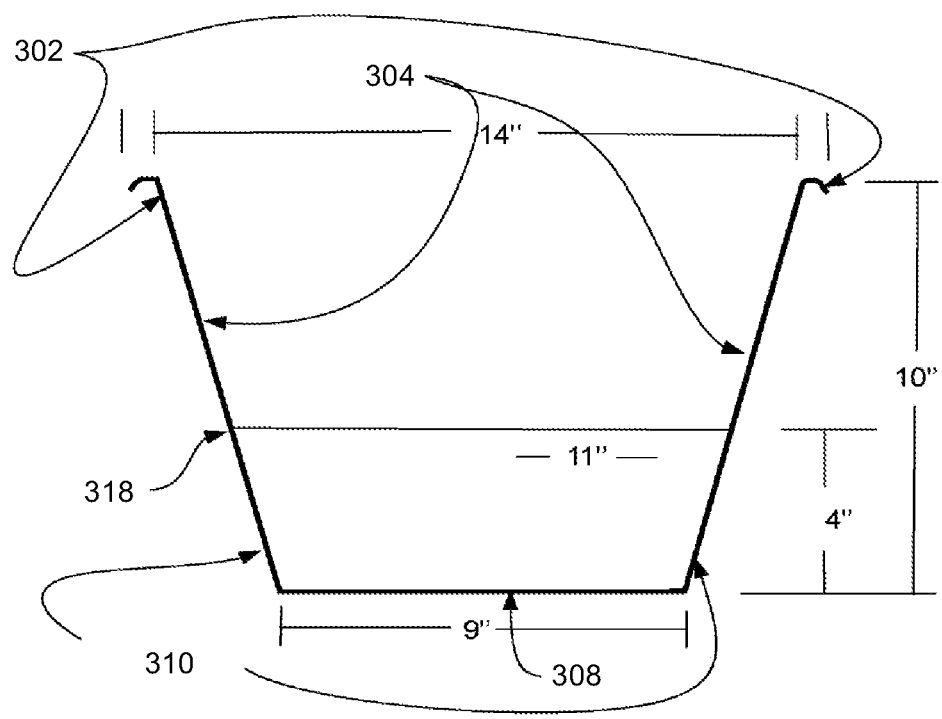
FIG. 3 is a side view of a weight-bearing member of a planter apparatus according to an embodiment for holding a 2-gallon planter.

FIG. 3 is a diagram of a planter apparatus 300 for holding a 2-gallon planter. Planter apparatus 300 provides a means of containing and holding a smaller planter (2-gallon volume having dimension of 9" tall and 8.5" top diameter) in a larger planter, and that provides a means of transporting the smaller planter to the second larger planter. The smaller planter and the larger planter are not shown in FIG. 3.

Planter apparatus 300 is a frame that includes at least two hangers 302 and at least two vertical members 304. Each of the hangers 302 is integral (formed from one piece of material) with one of the vertical members 304 (as shown in FIG. 3). In some embodiments of the planter apparatus 300, each of the hangers 302 further comprise a hook that is curved away and downward from the first (upper) end of the vertical members 304 (as shown in FIG. 3). In some embodiments of the planter apparatus 300, each of the hooks is configured to be removably coupled to the rim of a mouth of the second planter (not shown in FIG. 3).

A bottom 308 is attached to a second (lower) end 310 of the each of the vertical members 304. The bottom 308 further comprises a first ring (not shown in FIG. 3) along a horizontal plane and the bottom 308 further comprises additional structure in the horizontal plane, where in the additional structure further comprises at least one cross-member (not shown in FIG. 3). The at least one cross-member further comprises two equilateral cross-members that intersect each other in a center of the bottom 308 (not shown in FIG. 3), forming an X-shaped bottom and, with the vertical members a truncated conical volume configured to receive a planter.

In some embodiments of the planter apparatus 300, the at least two hangers 302 comprises four hangers 302 (not shown in FIG. 3) and the at least two vertical members 304 comprises four vertical members 304 (as shown in FIG. 3). The planter apparatus 300 is not limited to four vertical members 304. In some embodiments, the planter apparatus 300 has a minimum of 3 vertical members 304. In some embodiments, the planter apparatus 300 has a plurality of pairs of vertical members 304.

In some embodiments of the planter apparatus 300, the frame further comprises at least one middle ring 318 that forms a second ring (not shown in FIG. 3) along the horizontal plane; and each middle ring 318 is in contact with (e.g., attached, removably coupled to) each of the vertical members 304. The second ring can be used to expand the diameter of the mouth of the planter apparatus 300.

In some embodiments of the planter apparatus 300, the hangers 302, the vertical members 304, the bottom 308 and the middle ring 318 are independently metal wire (as shown in FIG. 3) or plastic.

In some embodiments of the planter apparatus 300, an interior geometric size and an interior shape of the frame is larger than an exterior geometric size and an exterior shape of the smaller planter. In some embodiments of the planter apparatus 300, the interior geometric size and the interior shape of the frame is approximately the exterior geometric size and the exterior shape of the smaller planter.

In some embodiments, (not shown in FIG. 3), distal vertical members 304 and cross-members of the bottom 308 are formed from singular pieces of material, such as metal wire or plastic. Two distal vertical members 304 and one cross-member of the bottom 308 are formed from a singular piece of material, such as metal wire or plastic and another two distal vertical members 304 and one cross-member of the bottom 308 are formed from another singular piece of material (not shown in FIG. 3), such as metal wire or plastic. In some embodiments, two vertical members and a cross-member connecting the two vertical members at the second end of the respective vertical members form a U-shaped member.

The planter apparatus 300 provides a means of containing and holding a smaller planter (2 gallon volume having dimension of 9" tall and 8.5" top diameter) in a larger planter, and a means of transporting the smaller planter to a second larger planter because the smaller planter can be removed by lifting the planter apparatus 300 by the hangers 302, thereby lifting the smaller planter in the planter apparatus 300 from the larger planter, and thereafter the planter apparatus 300 and the smaller planter in the apparatus can be easily transported to another larger planter without having to dig out the plant from the larger planter.

The size and dimensions of apparatus 200 and apparatus 300 are exemplary only, and not limiting.

Figure 4:
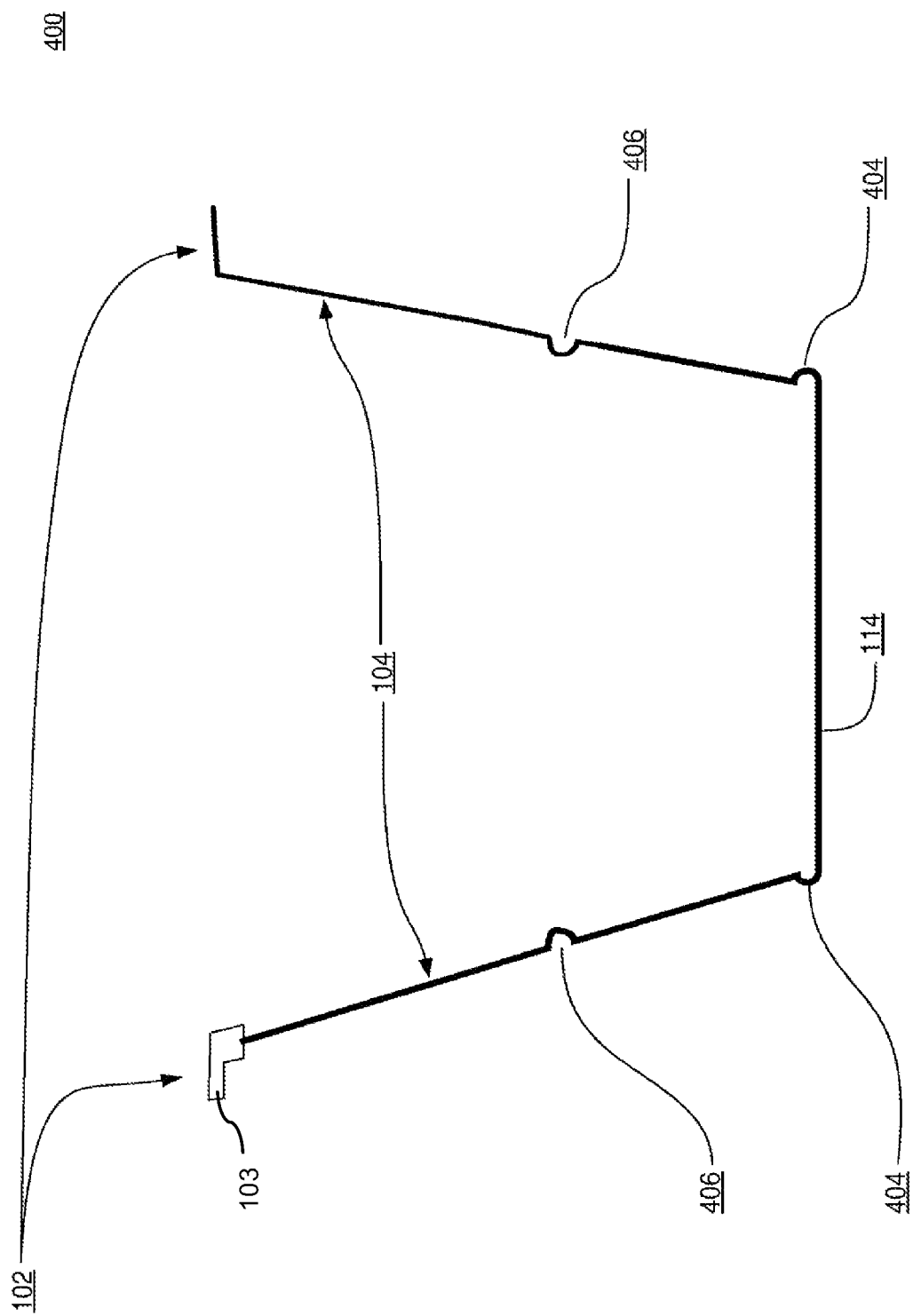
FIG. 4 is a side view of a weight-bearing member of a planter apparatus configured for flat packaging/shipping of a planter apparatus, in accordance with embodiments described herein.

FIG. 4 is a diagram of weight-bearing member 400 for flat packaging/shipping of a planter apparatus. When assembled, the planter apparatus provides a means of containing and holding a smaller planter in a larger planter, and a means of transporting the smaller planter to a second larger planter. The weight-bearing member 400 can be formed from metal or plastic. In some embodiments, the weight-bearing member 400 comprises one or more protrusions, such as the protrusions 404 at the second (lower) end of the vertical members 104 and/or the protrusions 406 at a position intermediate or between the first (upper) end and second (lower) end of the vertical members.

Figure 5:
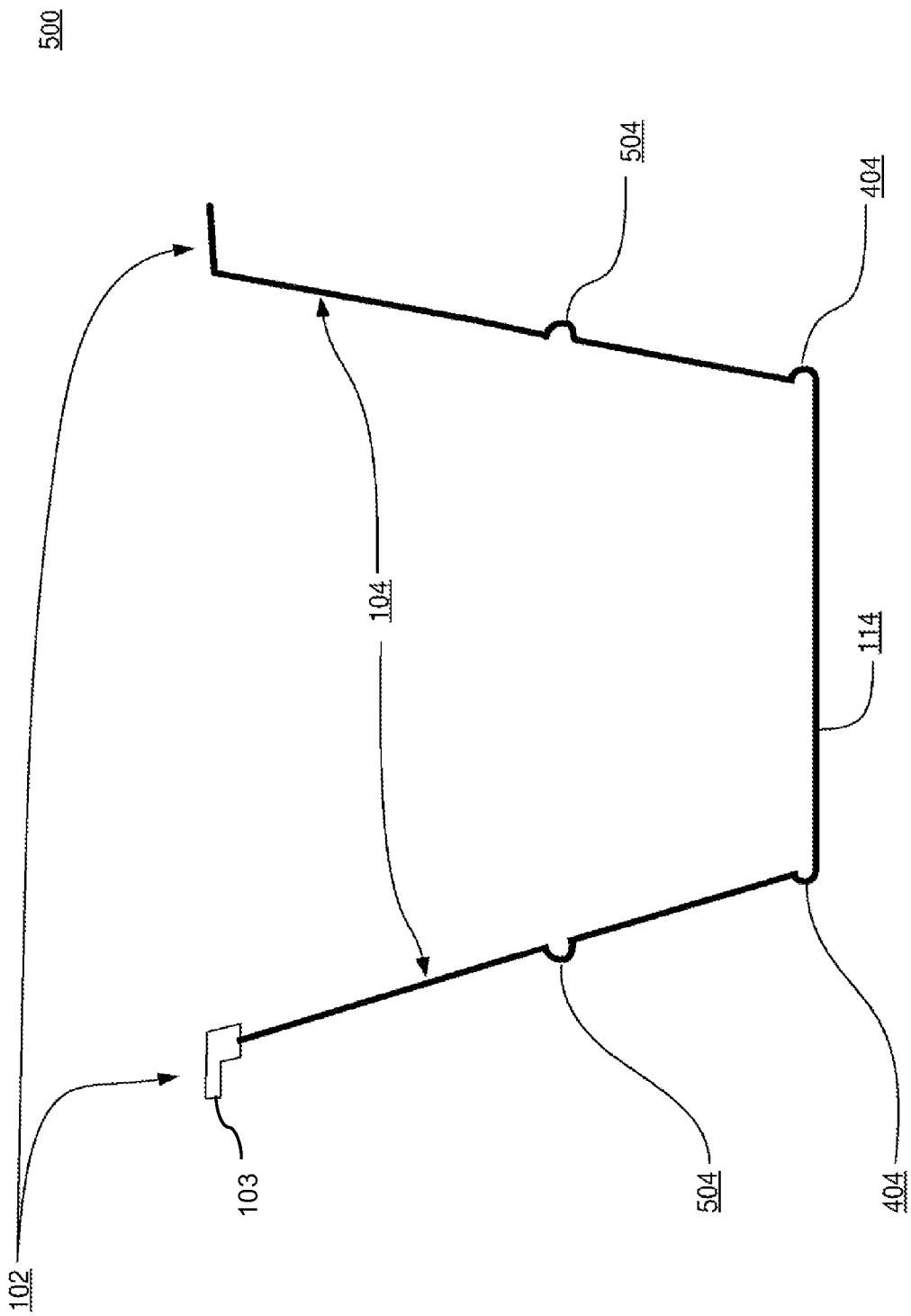
FIG. 5 is a side view of a weight-bearing member of a planter apparatus configured for flat packaging/shipping of a planter apparatus, in accordance with embodiments described herein.

FIG. 5 is a diagram of weight-bearing member 500 for flat packaging/shipping of a planter apparatus, according to an embodiment. When assembled, the planter apparatus provides a means of containing and holding a smaller planter in a larger planter, and a means of transporting the smaller planter to a second larger planter. The weight-bearing member 500 can be formed from metal or plastic. In some embodiments, the weight-bearing member 500 comprises one or more protrusions, such as the protrusions 404 at the second (lower) end of the vertical members 104 and/or the protrusions 504 at an intermediate position between the first (upper) end and second (lower) end of the vertical members.

Figure 6:
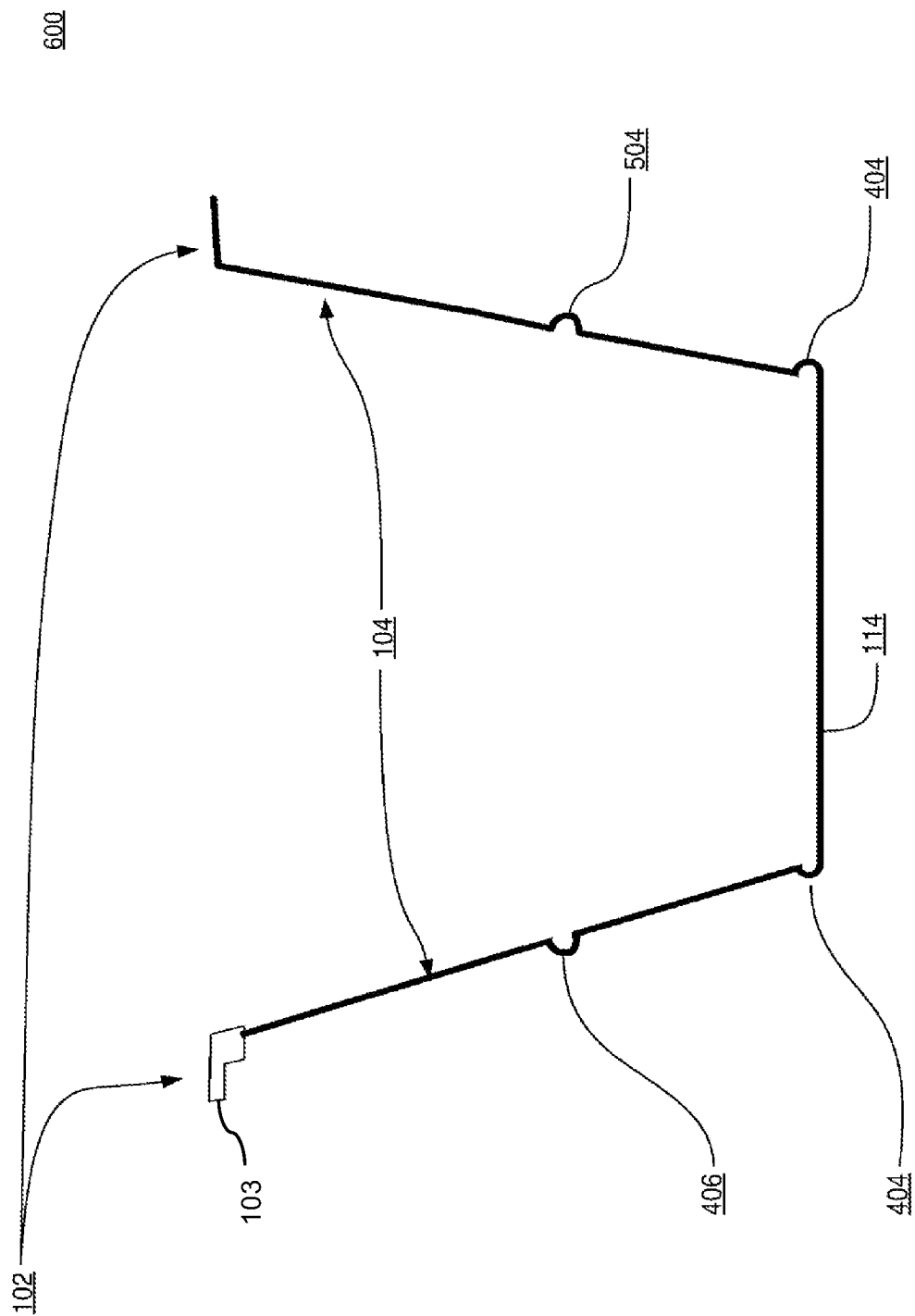
FIG. 6 is a side view of a weight-bearing member of a planter apparatus configured for flat packaging/shipping of a planter apparatus, in accordance with embodiments described herein.

FIG. 6 is a diagram of weight-bearing member 600 for flat packaging/shipping of a planter apparatus, according to an embodiment. When assembled, the planter apparatus provides a means of containing and holding a smaller planter in a larger planter, and a means of transporting the smaller planter to a second larger planter. The weight-bearing member 600 can be formed from metal or plastic. In some embodiments, the weight-bearing member 600 comprises one or more protrusions, such as the protrusions 404 at the second (lower) end of the vertical members 104 and/or the protrusions 406, 504 at an intermediate position between the first (upper) end and second (lower) end of the vertical members.

Figure 7:
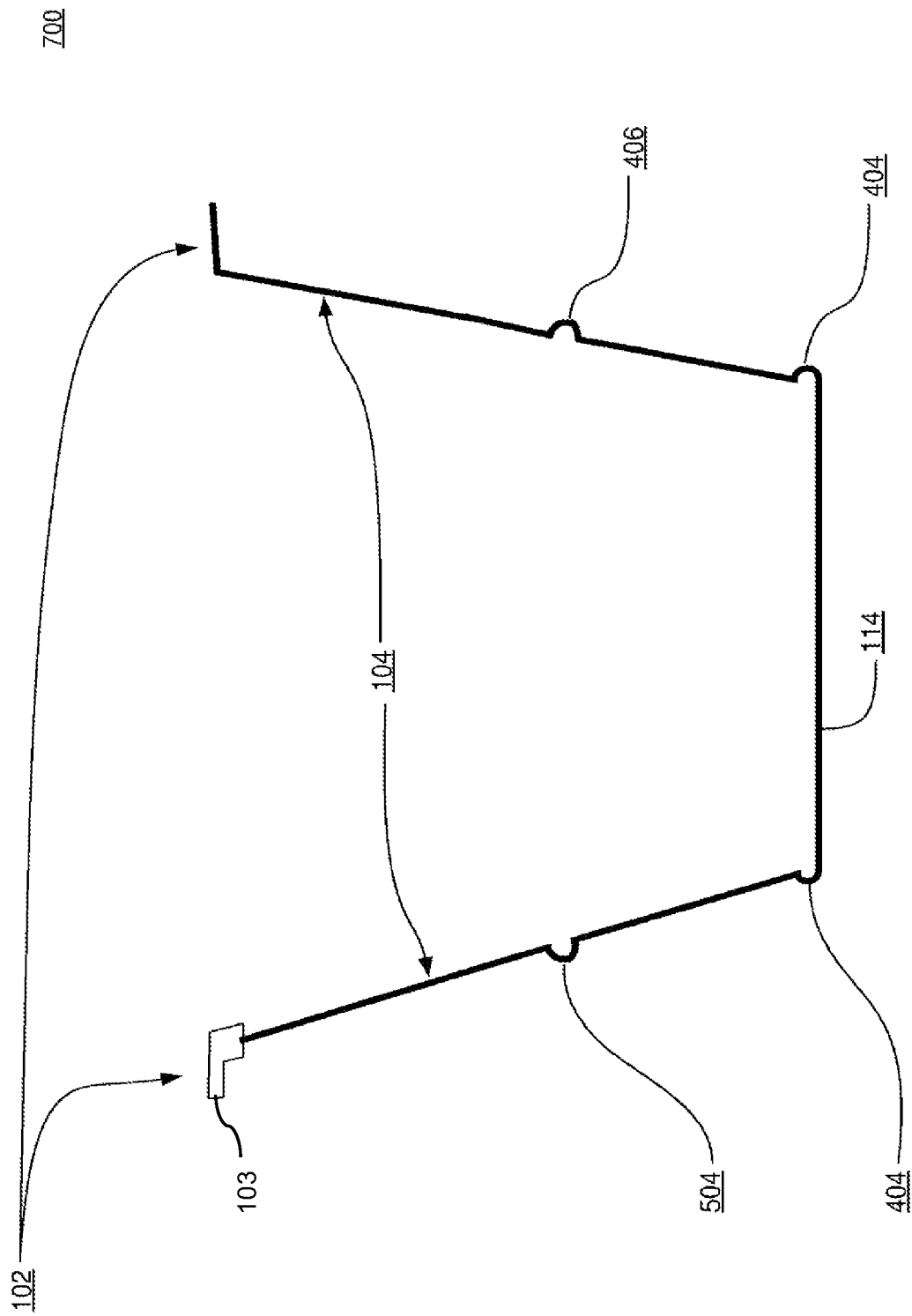
FIG. 7 is a side view of a weight-bearing member of a planter apparatus configured for flat packaging/shipping of a planter apparatus, in accordance with embodiments described herein.

FIG. 7 is a diagram of weight-bearing member 700 for flat packaging/shipping of a planter apparatus, according to an embodiment. When assembled, the planter apparatus provides a means of containing and holding a smaller planter in a larger planter, and a means of transporting the smaller planter to a second larger planter. The weight-bearing member 700 can be formed from metal or plastic. In some embodiments, the weight-bearing member 700 comprises one or more protrusions, such as the protrusions 404 at the second (lower) end of the vertical members 104 and/or the protrusions 406, 504 at an intermediate position between the first (upper) end and second (lower) end of the vertical members.

Figure 8:
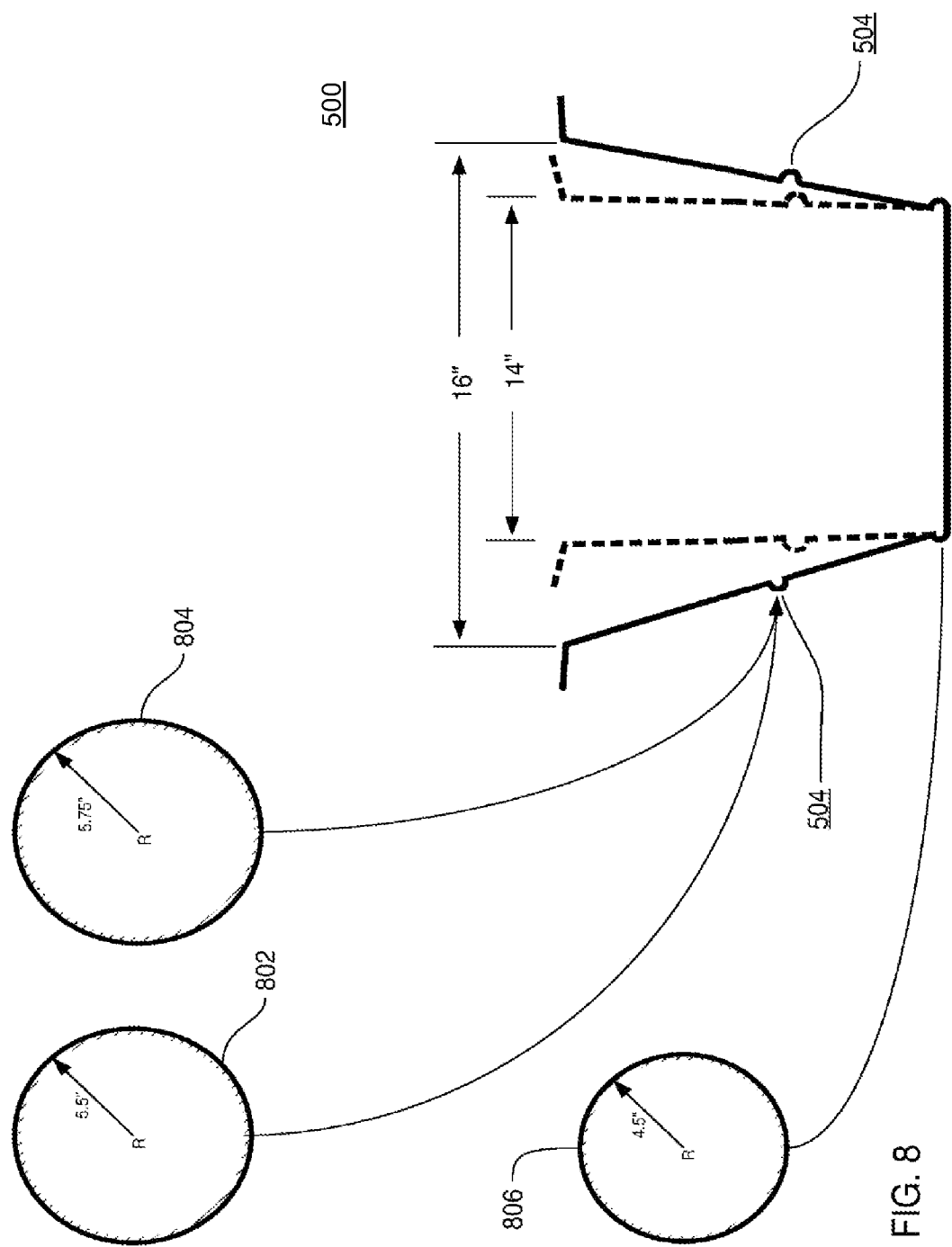
FIG. 8 is a side view of a weight-bearing member of a planter apparatus configured for flat packaging/shipping of a planter apparatus, in accordance with embodiments described herein.

FIG. 8 is a diagram of apparatus 500 for flat packaging/shipping of a planter apparatus, according to an embodiment. When assembled, the planter apparatus provides a means of containing and holding a smaller planter in a larger planter, and a means of transporting the smaller planter to a second larger planter.

FIG. 8 shows two different middle rings 802, 804, having different dimensions, middle ring 802 having a radius of 5.5" and a diameter of 11.0" and middle ring 804 having a radius of 5.75" and a diameter of 11.5". When the middle ring 802 is inserted into the protrusions 504 on the vertical members, the apparatus 500 has a diameter of approximately 14". When middle ring 804 is inserted into the protrusions 504 on the vertical members, the apparatus 500 has a diameter of approximately 16". FIG. 8 shows one bottom ring 806, having a radius of 4.5". When the bottom ring 806 is inserted into the protrusions at the first (lower) end of the vertical members, the apparatus 500 has a diameter of approximately 9". Because of the fixed dimensions of the cross-members 114, the bottom ring radius never varies significantly.

Figure 9:
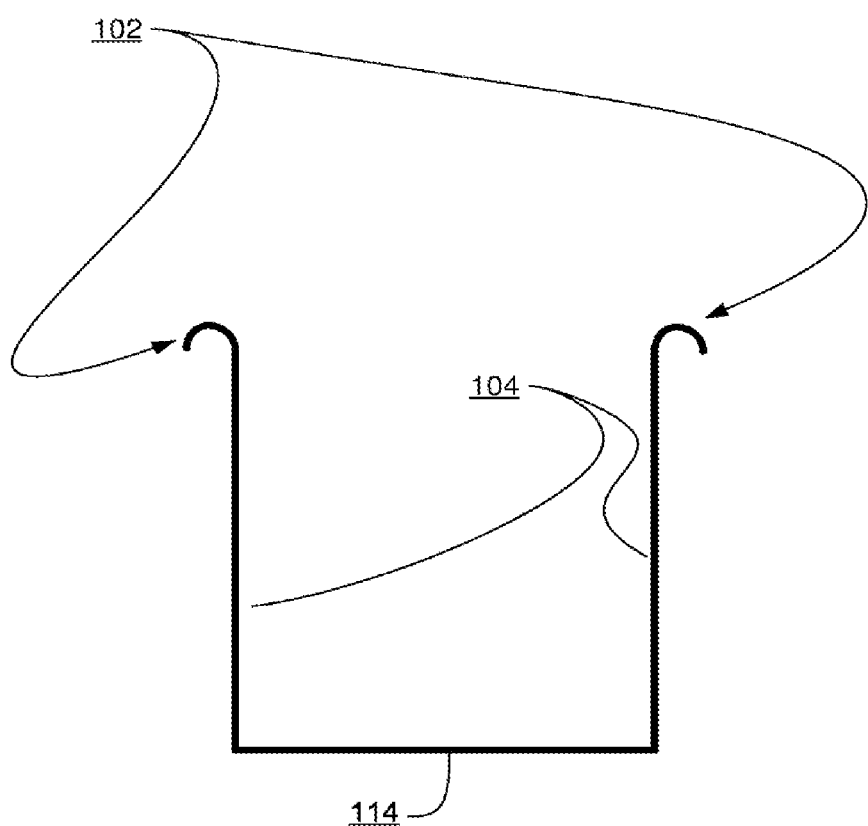
FIG. 9 is a side view of a weight-bearing member of a planter apparatus configured for flat packaging/shipping of a planter apparatus, according to an embodiments having right angles, in accordance with embodiments described herein.

FIG. 9 is a diagram of, according to an embodiment having right angles at the first (lower) ends of the vertical members 104 and the cross-member 114. The provides a means of containing and holding a smaller planter in a larger planter. The weight-bearing member 900 can be formed from metal or plastic.

Figure 10:
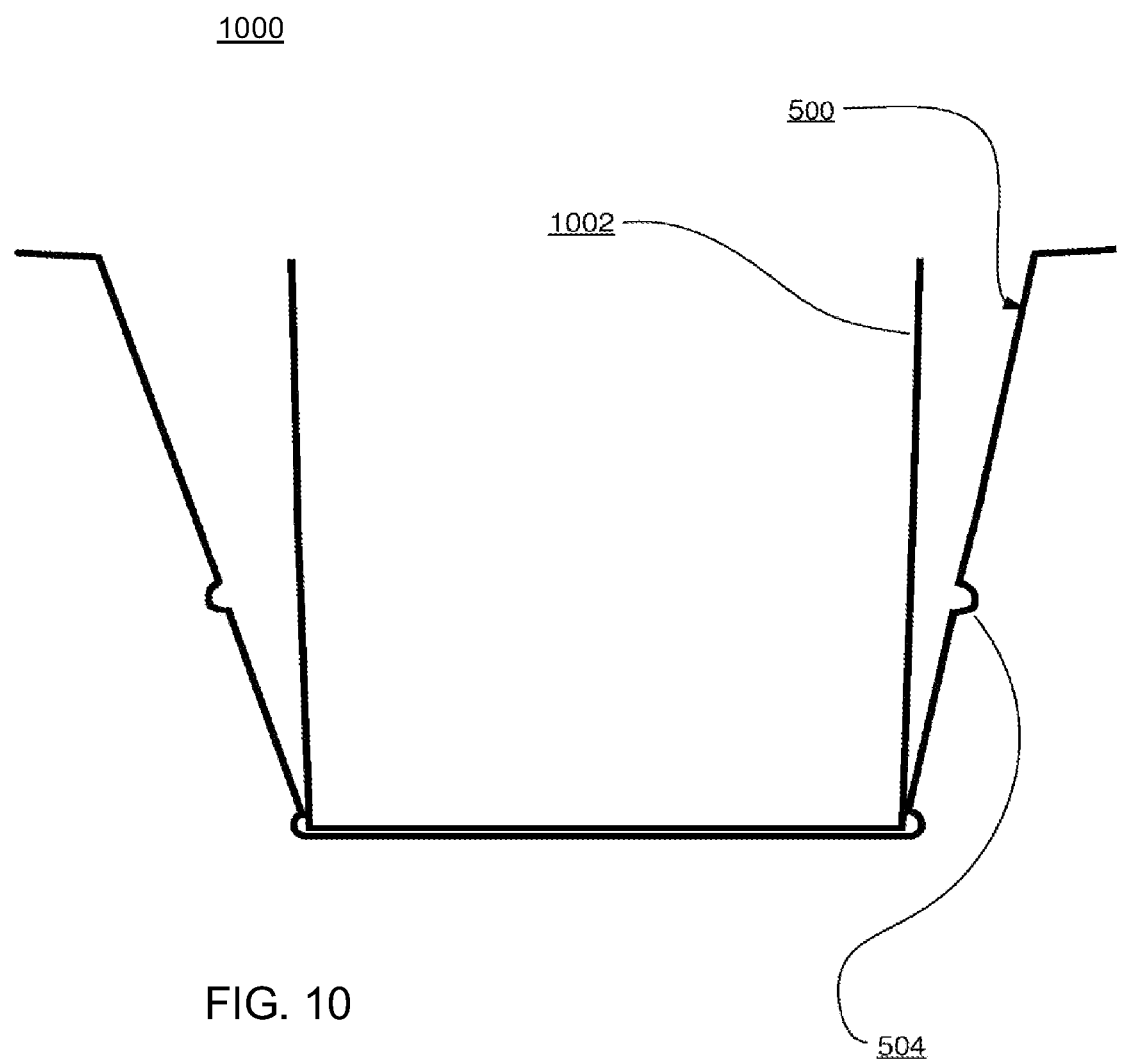
FIG. 10 is a side view of a planter apparatus and a planter integrated together, in accordance with embodiments described herein.

FIG. 10 is a diagram of an apparatus 1000 of a planter apparatus and a planter integrated together, according to an embodiment. Apparatus 1000 includes a conventional planter 1002 that is inserted into and contained within the planter apparatus, using the weight-bearing member 500 as shown in FIG. 10. As an alternative to the weight-bearing member 500, other apparatus can be used, such as the planter apparatus 100, the planter apparatus 200, the planter apparatus 300, the weight-bearing member 400, the weight-bearing member 700, or the weight-bearing member 800.

In some embodiments, the weight-bearing member 500 and the planter 1002 are integrated together to form the singular and unitary planter apparatus 1000. In some embodiments, the weight-bearing member 500 and the planter 1002 are formed from a single piece of material, in other embodiments, the weight-bearing member 500 and the planter 1002 are permanently attached to each other by gluing, melting or welding portion of the weight-bearing member 500 and the planter 1002 that are in contact with each other, and in other embodiments, the weight-bearing member 500 and the planter 1002 are temporarily and removably attached to each other. The conventional planter 1002 can be filled with dirt or other plant growing medium and a plant can be planted or the dirt of medium.

Figure 11:
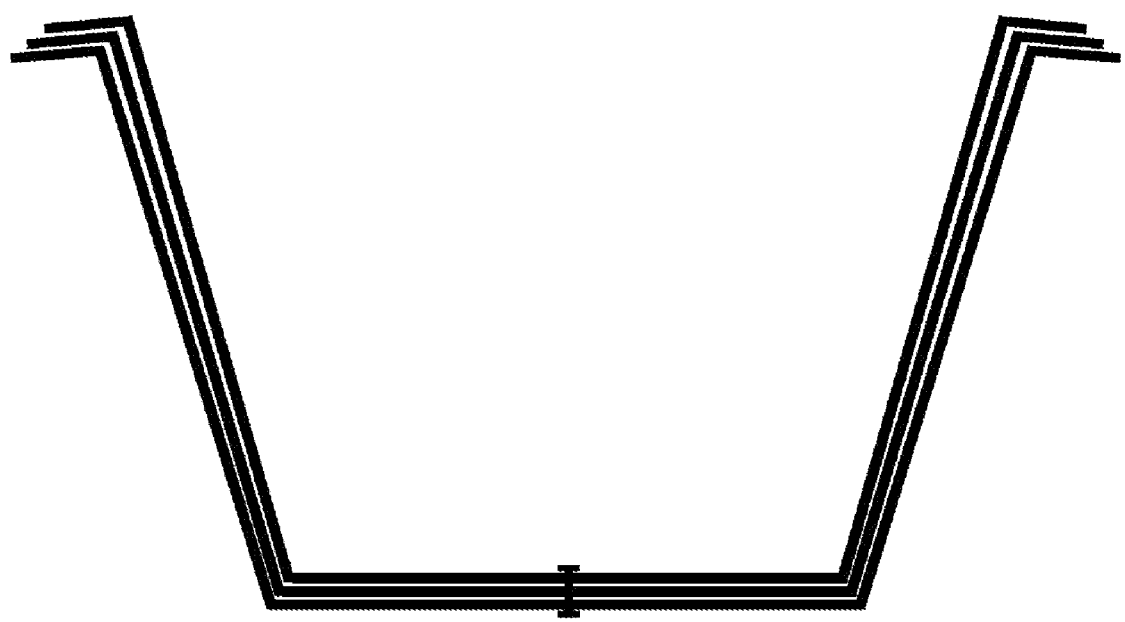
FIG. 11 is a side view of a planter apparatus in a first state of deployment, in accordance with embodiments described herein.
Figure 12:
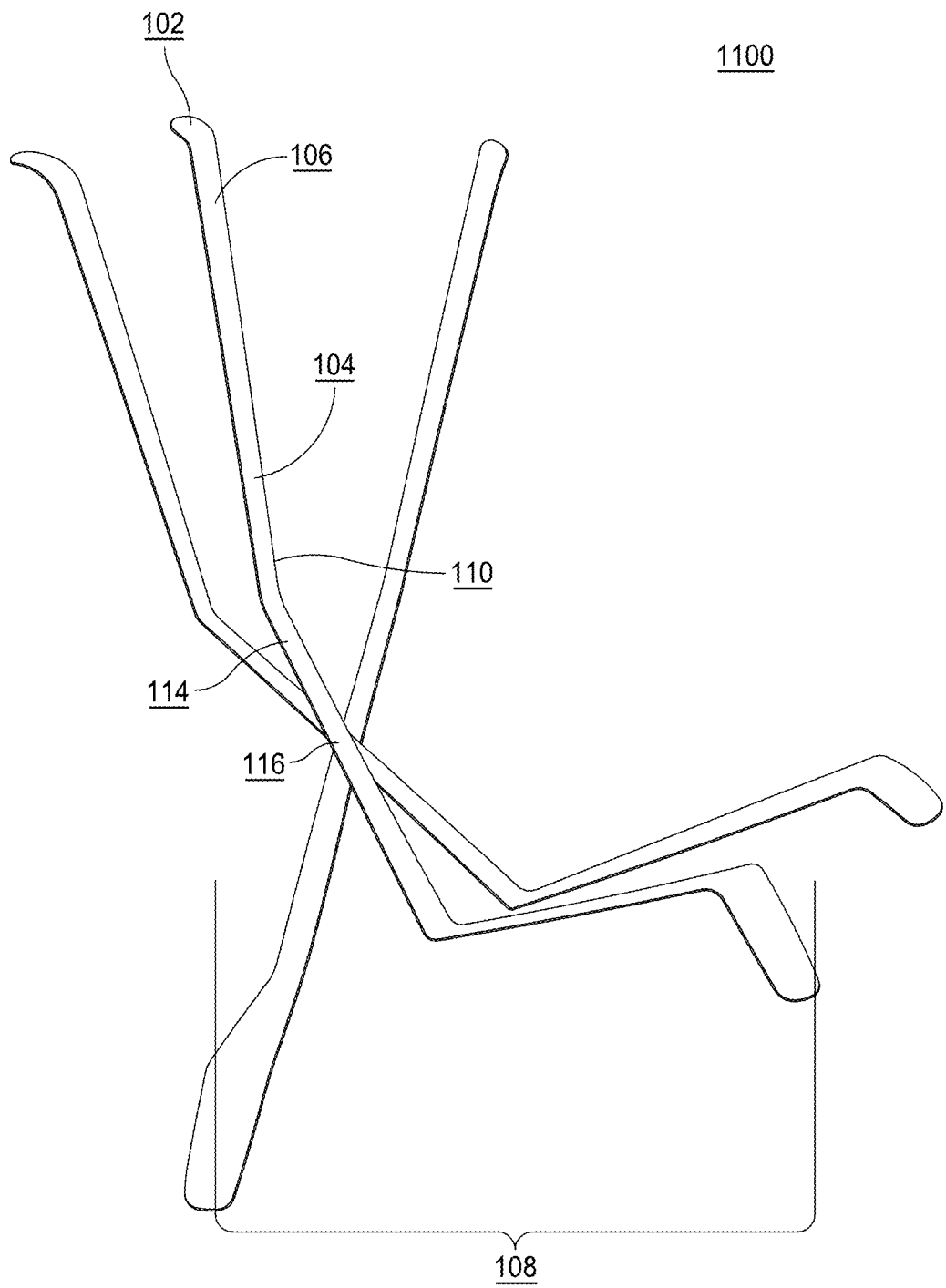
FIG. 12 is an isometric view diagram of a planter apparatus in a second state of deployment, in accordance with embodiments described herein.
Figure 13:
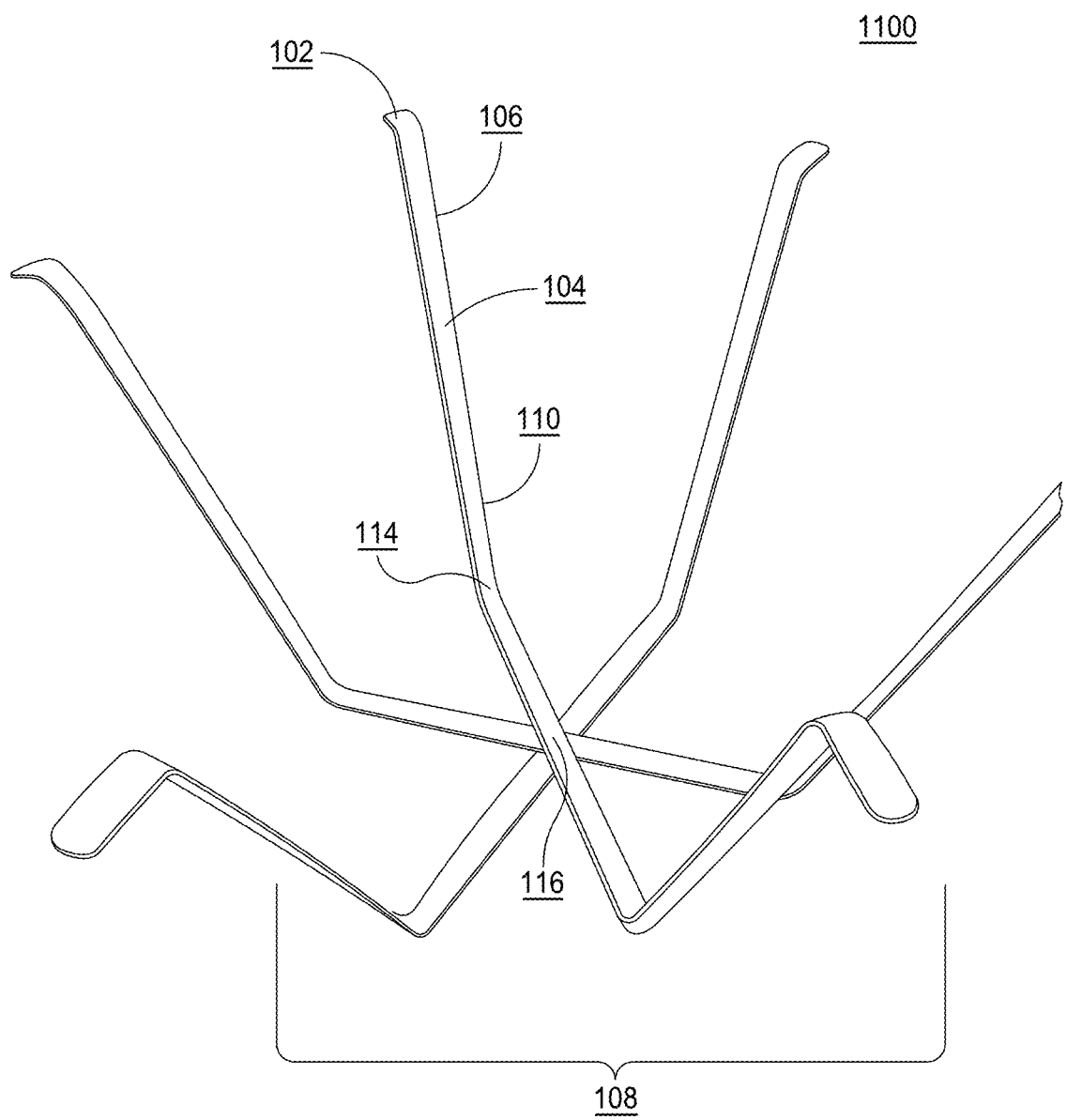
FIG. 13 is an isometric diagram of a planter apparatus in a third state of deployment, in accordance with embodiments described herein.
Figure 14:
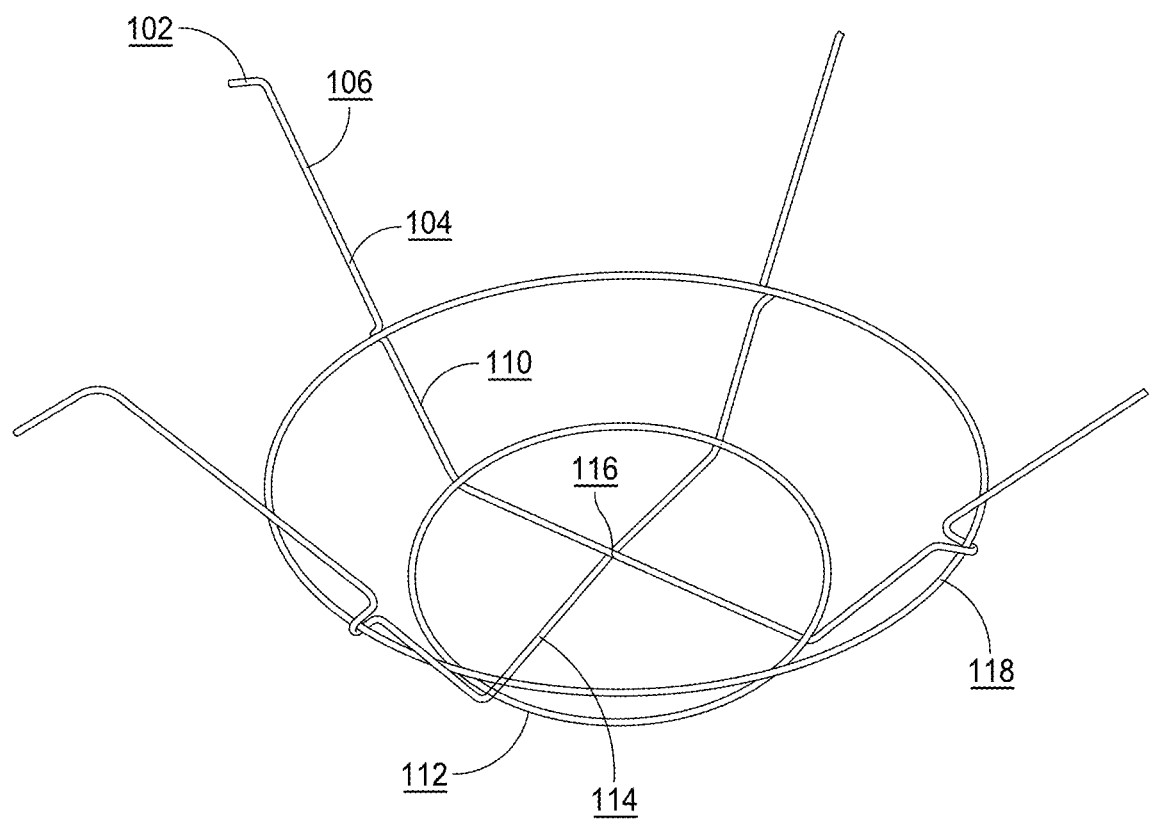
FIG. 14 is an isometric diagram of a two-part planter apparatus in a state of full deployment, in accordance with embodiments described herein.

FIGS. 11-13 are diagrams of a planter apparatus 1100 in various states of deployment, according to an embodiment. FIG. 14 is a diagram of a two-part planter apparatus in a state of full deployment, according to an embodiment.

Planter apparatus 1100 and 1400 is a frame to hold a first planter in a second planter in which the frame includes at least two hangers 102 and at least two vertical members 104, each of the vertical members 104 attached to at least one of the hangers 102 on a first (upper) end 106 of the vertical members 104.

In some embodiments of planter apparatus 1100 and 1400, each of the hangers 102 further comprise a hook that is curved away and downward from the first (upper) end 106 of the vertical members 104 (as shown in FIGS. 11-14).

In some embodiments of planter apparatus 1100 and 1400, each of the hooks are configured to be removably coupled to a mouth of the second planter (the second planter is not shown in FIGS. 11-14).

In some embodiments of the planter apparatus 1400, the bottom comprises the first ring 112 (bottom ring) along a horizontal plane and the bottom 108. The first ring 112 shown in FIG. 14 is an outer compression ring. Some embodiments of the planter apparatus 1400 further comprise additional structure in the horizontal plane, wherein the additional structure further comprises at least one cross-member 114 (as shown in FIG. 11 and FIG. 14).

In some embodiments of the planter apparatus 1100 and 1400, the at least one cross-member 114 comprises two equilateral cross-members that intersect each other in a center 116 of the bottom (as shown in FIG. 14).

In some embodiments of the planter apparatus 1100 and 1400, the at least two hangers 102 comprises four hangers 102 (as shown in FIG. 14) and the at least two vertical members 104 comprises four vertical members 104 (as shown in FIG. 14).

In some embodiments of the planter apparatus 1100, each of the hangers 102 is integral (formed from one piece of material) with one of the vertical members 104 (as shown in FIGS. 11-13). For round planters, the planter apparatus 1100 and 1400 includes at least three vertical members 104 because having only two vertical members 104 is more susceptible to swaying from side-to-side from sideways bumps or jolts.

In some embodiments, as shown in FIGS. 11-13, the pair of U-shaped members are pivotably coupled to one another at the center position 116 of the respective cross-members, whereby the pair of U-shaped members can pivot about the center position such that their respective first and second vertical members can be variably spaced apart from one another (e.g., not spaced apart and in the same vertical plane, equally spaced apart in different vertical planes, or unequally spaced apart in different vertical planes). In some embodiments, for example, as shown in FIG. 11, the first and second vertical members of each respective U-shaped member are not spaced apart and in the same vertical plane; whereas in FIGS. 12 and 13, the respective first and second vertical members of each U-shaped member are in different vertical planes. In some embodiments, as shown in FIG. 12, the respective first and second vertical members of each U-shaped member are unequally spaced apart. In some embodiments, as shown in FIG. 13, the respective first and second vertical members of each U-shaped member are equally spaced apart or approximately equally spaced apart.

In some embodiments of the planter apparatus 1400, the frame comprises at least one middle ring 118 that further comprises second ring along the horizontal plane and each middle ring is attached to each of the vertical members 104, which can be used to expand the radius and diameter of the hook pattern, or can be used to compress to fit smaller openings. In some embodiments, the at least one middle ring 118 is configured to extend circumferentially around the frame and contact each of the vertical members. In some embodiments, each of the vertical members includes one or more protrusions (e.g., 404, 406, 504) configured to receive and retain the at least one middle ring 118. In some embodiments, each of the one or more protrusions protrudes externally away from the bottom 108 or cross-member 114. In some embodiments, each of the one or more protrusions protrudes externally away from an internal volume defined by the planter apparatus. In some embodiments, the internal volume defined by the planter apparatus has a truncated conical shape configured to receive a planter.

In some embodiments of the planter apparatus 1100 and 1400, the hangers 102, the vertical members 104, the bottom 108 and the middle ring 118 are metal wire (as shown in FIG. 14), plastic, or any functionally equivalent weight-bearing material. In some embodiments of the planter apparatus 1100 and 1400, the hangers 102, the vertical members 104, the bottom 108 and the middle ring 118 are metal wire. In some embodiments of the planter apparatus 1100 and 1400, the hangers 102, the vertical members 104, the bottom 108 and the middle ring 118 are plastic.

In some embodiments of the planter apparatus 1100 and 1400, an interior geometric size and an interior shape of the frame is larger than an exterior geometric size and an exterior shape of the first planter. In some embodiments of the planter apparatus 1100 and 1400, the interior geometric size and the interior shape of the frame is approximately the exterior geometric size and the exterior shape of the first planter.

In some embodiments, such as shown in FIG. 11, distal vertical members 104 and cross-members of the bottom 108 are formed from singular pieces of material, such as metal wire (as shown in FIG. 11). In the embodiments shown in FIGS. 11-13, the pair of distal vertical members 104 and one cross-member of the bottom 108 are formed from a singular piece of material, such as metal wire, a second pair of distal vertical members 104 and one cross-member of the bottom are formed from another singular piece of material, such as metal wire and a third pair of distal vertical members 104 and one cross-member of the bottom are formed from another singular piece of material, such as metal wire (as shown in FIGS. 11-13).

Planter apparatus 1100 and 1400 provide means of containing and holding a smaller planter in a larger planter, and provide means of transporting the smaller planter to a second larger planter because the smaller planter can be removed by lifting the planter apparatus 1100 and 1400 by the hangers 102, thereby lifting the smaller planter in the planter apparatus 1100 and 1400 from the larger planter, and thereafter the planter apparatus 1100 and 1400 and the smaller planter in the apparatus can be easily transported to another larger planter without having to dig out the plant from the larger planter.

Figure 17:
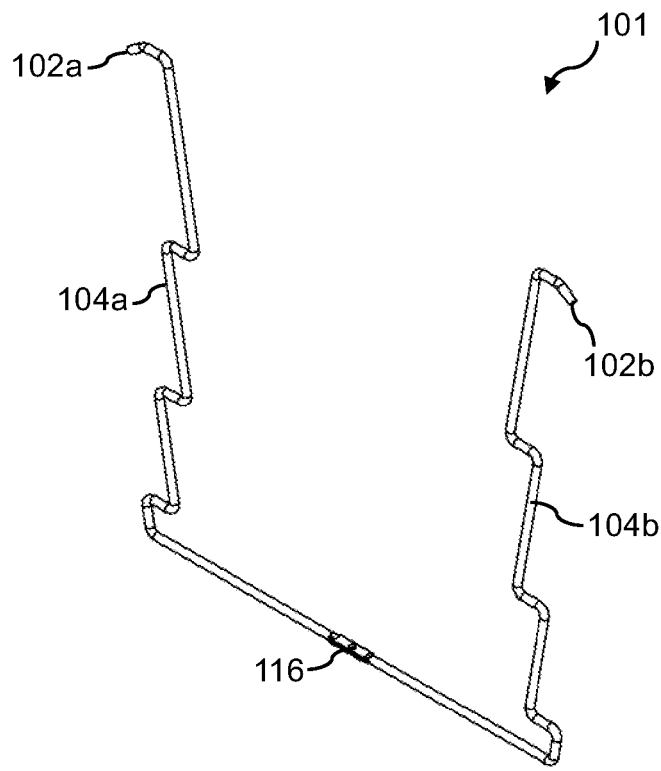
FIG. 17 is a perspective view of a U-shaped member used in a planter apparatus, in accordance with embodiments described herein.
Figure 18:
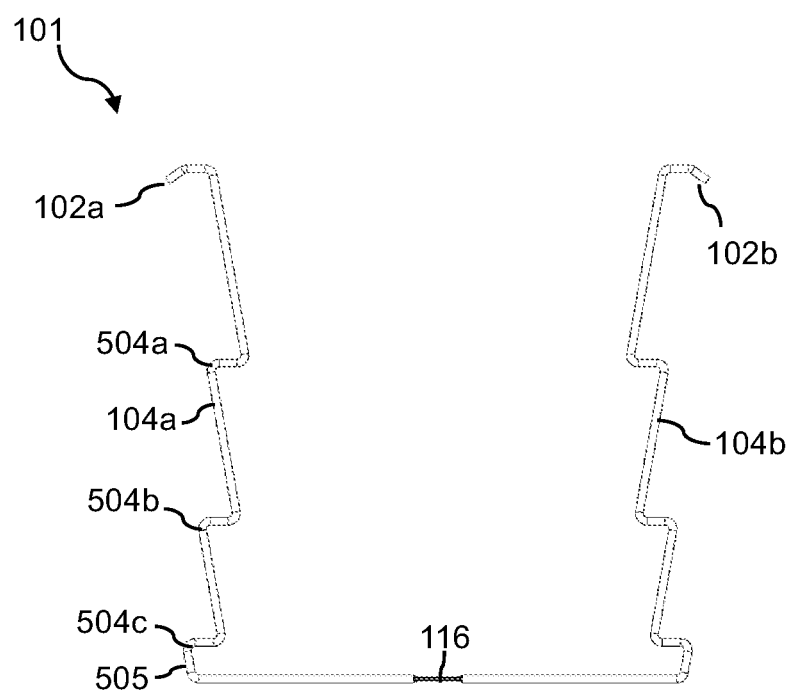
FIG. 18 is a side view of the U-shaped member in FIG. 17.
Figure 19:
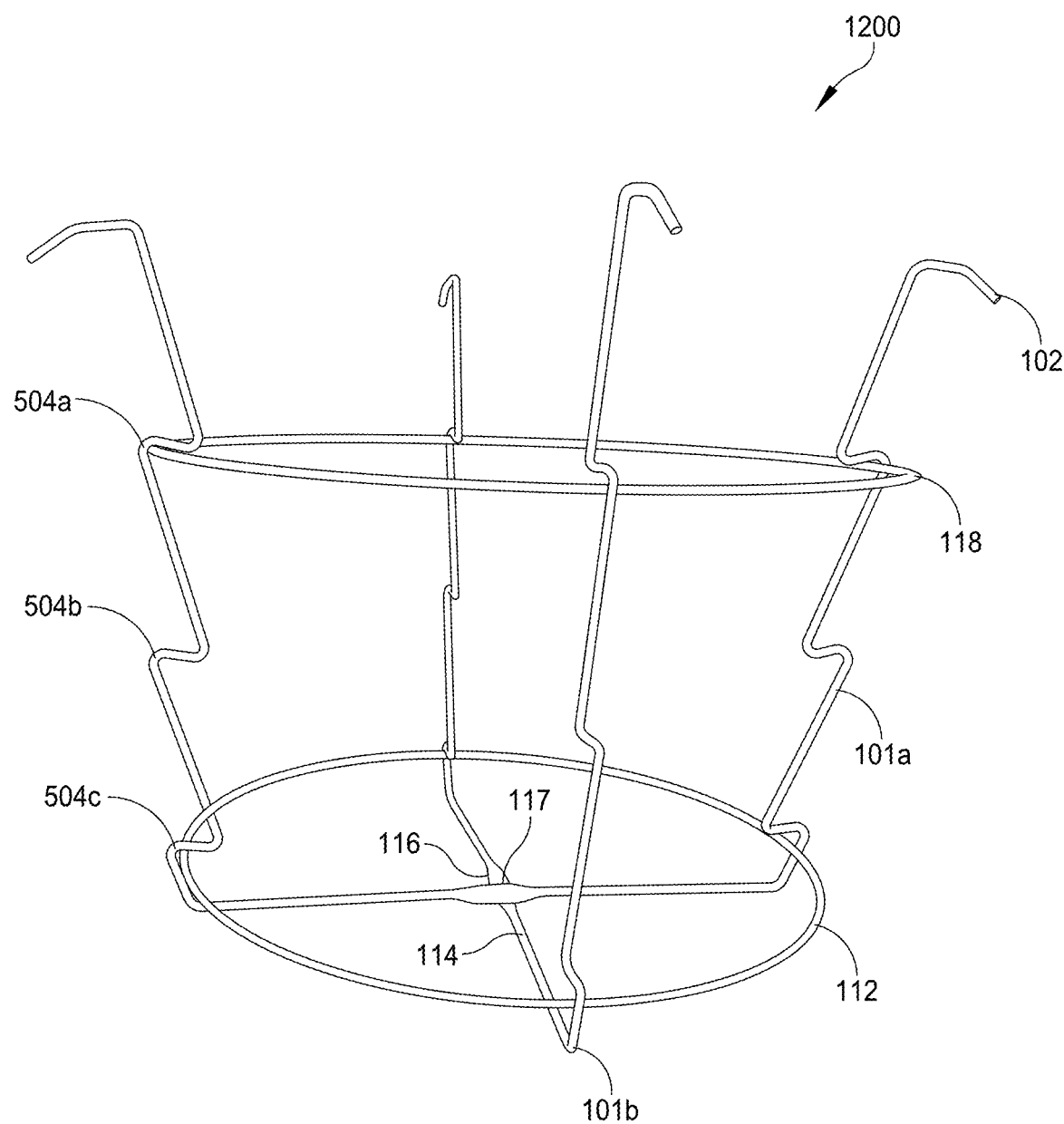
FIG. 19 is a front perspective view of a planter apparatus incorporating the U-shaped member in FIG. 17.
Figure 20:
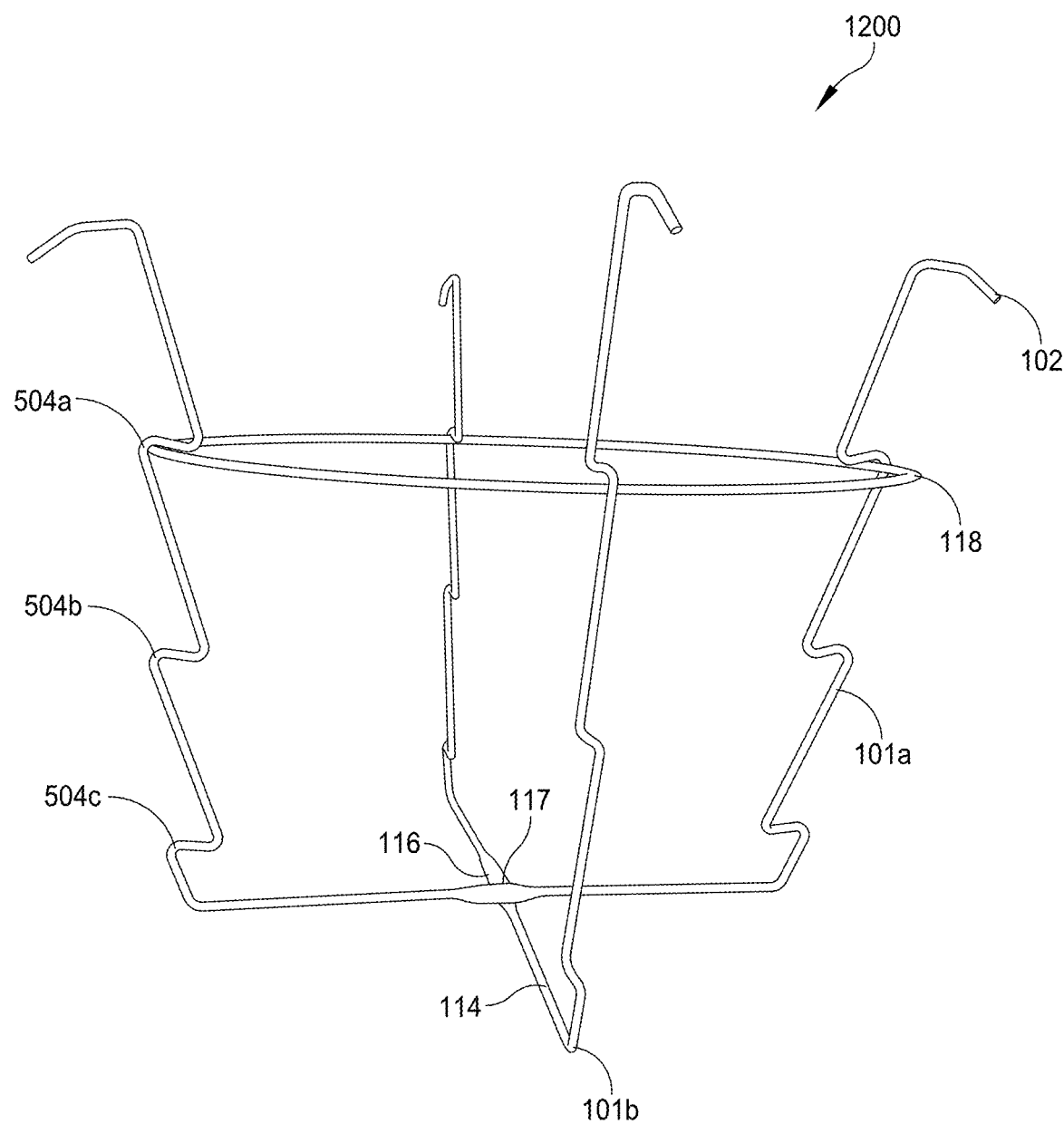
FIG. 20 is a front perspective view of a planter apparatus incorporating the U-shaped member in FIG. 17.

FIGS. 17-20 are diagrams of the planter apparatus 1200. In some embodiments, the planter apparatus 1200 comprises a pair of U-shaped members 101a, 101b, as shown in FIGS. 19 and 20. In some embodiments, each of the respective U-shaped members 101a, 101b comprises a first and second vertical member 104a, 104b, as shown in FIGS. 17 and 18. In some embodiments, each of the first and second vertical members 104a, 104b projects upward from opposing ends of the cross-member 114 to a first and second hanger 102a, 102b. In some embodiments, each of the respective first and second hangers comprises a hook-shaped head extending away from the cross-member 114, and each respective hanger is configured to be removably coupled to a rim of the second planter.

In some embodiments, the pair of U-shaped members 101a, 101b are coupled to one another at the center position 116 of the respective cross-members, forming an X-shaped bottom and a truncated conical volume configured to receive the first planter. In some embodiments, the center position 116 comprises a flat portion with a through-hole configured to receive the fastener 117 (e.g., rivet, pin). In some embodiments, the cross-members can pivot around the fastener 117 such that the vertical members of the U-shaped members 101a, 101b can move between a first position where they are spaced apart from one another (forming an X-shaped bottom) and a second position where they are adjacent (or in contact) with one another. In such embodiments, the U-shaped members 101a, 101b can be pivoted about the fastener 117 in the center position 116 between an open structure characterized by a truncated conical volume configured to receive the first planter and a closed structure that is generally flat.

In some embodiments, the pair of U-shaped members 101a, 101b are pivotably coupled to one another at the center position of their respective cross-members, whereby the pair of U-shaped members can pivot about the center position 116 such that the respective first and second vertical members of the pair of U-shaped members can be variably spaced apart from one another.

In some embodiments, the pair of U-shaped members includes a first U-shaped member 101a and a second U-shaped member 101b. In some embodiments, the hangers, the first and second vertical members, and the cross-member of the first U-shaped member 101a collectively form a first vertical plane and the first and second vertical members, and the cross-member of the second U-shaped member 101b collectively form a second vertical plane. In some embodiments, the first and second U-shaped members are pivotably coupled to one another and can pivot about the center position 116 of the respective cross-members such that the first and second vertical planes are in an overlapping or non-overlapping position relative to one another.

The pair of U-shaped members 101a, 101b can have any suitable size and shape. In some embodiments, the pair of U-shaped members 101a, 101b have identical size and shape. In some embodiments, the pair of U-shaped members 101a, 101b have different sizes and/or shapes. In some embodiments, the pair of U-shaped members 101a, 101b have the same general shape and different sizes (e.g., the length of the cross-member, the height of the vertical members, and/or the positions of the protrusions in the vertical members). In such embodiments, one of the U-shaped members is configured such that when the pair are pivotably coupled to one another at their respective center positions 116, the U-shaped member that is coupled on top (e.g., U-shaped member 101b in FIG. 19) can be pivoted to a position that is coplanar with the other U-shaped member (e.g., U-shaped member 101a in FIG. 19). In such embodiments, the respective vertical planes of the pair of U-shaped members can overlap and the coupled pair of U-shaped members 101a, 101b can lay flat (in the same plane). In such embodiments, the relative lengths of the cross-members, the relative heights of the vertical elements, and the relative sizes and positions of the protrusions and hangers can be adjusted such that one of the U-shaped members fits within the other U-shaped member when the pair of U-shaped members are each flat on a surface.

In some embodiments, the planter apparatus 1200 comprises one or more removable rings configured to extend circumferentially around the frame and contact the first and second vertical member of each respective U-shaped member.

In some embodiments, each of the first and second vertical members 104a, 104b comprises one or more protrusions. For example, as shown in FIGS. 17-20, the vertical member of each U-shaped member can include the protrusions 504a, 504b, and 504c, which are spaced-apart from one another. In some embodiments, each of the protrusions in the vertical members has a zigzag shape (e.g., the vertical member projects upward from the crossmember for a distance and then angles inward toward the opposing vertical member for a short distance and then angles upward again). In some embodiments, each of the first and second vertical members 104a, 104b comprises a zigzag protrusion adjacent to the cross-member 114. In some embodiments, each of the first and second vertical members 104a, 104b comprises one or more zigzag protrusions positioned between the first (upper) and second (lower) ends of the respective vertical members.

In some embodiments, the planter apparatus 1200 comprises a plurality of circumferentially extending, removable rings. In some embodiments, as shown in FIG. 19, the planter apparatus 1200 comprises the first ring 118, positioned between the first (upper) and second (lower) ends of the vertical members, and the second ring 112, positioned at the second end of the vertical members in a position that is adjacent to the crossmember 114. In some embodiments, the first ring 118 is positioned in the first, upper protrusion 504a of each vertical member and the second ring 118 is positioned in the second, lower protrusion 504c of each vertical member.

In some embodiments, the planter apparatus 1200 comprises a single circumferentially extending ring. In some embodiments, as shown in FIG. 20, the planter apparatus 1200 comprises the first ring 118, positioned between the first (upper) and second (lower) ends of the vertical members. In some embodiments, the first ring 118 is positioned in the first, upper protrusion 504a of each vertical member. In such embodiments, there is no second ring inserted in a position adjacent to the cross-members.

Figure 15:
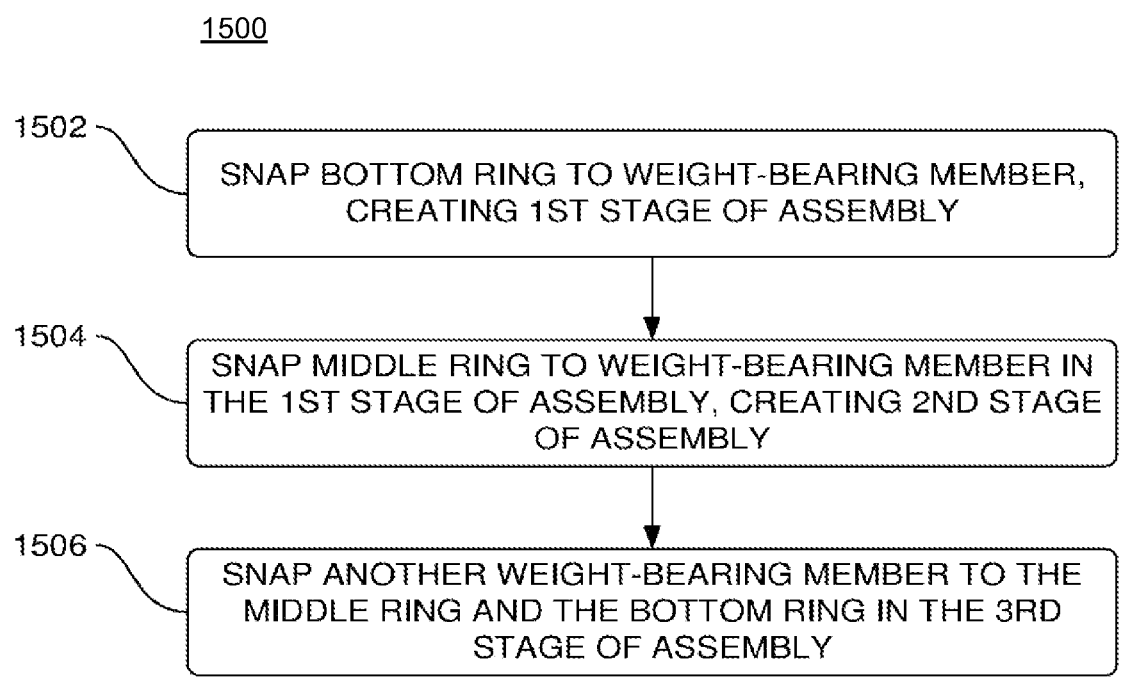
FIG. 15 is a flowchart of a method to assemble a planter apparatus, in accordance with embodiments described herein.

FIG. 15 is a flowchart of a method 1500 to assemble a planter apparatus, according to some embodiments. The method 1500 includes snapping a bottom ring to a weight-bearing member in step 1502, thus creating a 1st stage of assembly; snapping a middle ring to the weight-bearing member in the 1st stage of assembly in step 1504, thus creating a 2nd stage of assembly; and snapping another weight-bearing member to the middle ring and the bottom ring, in step 1506 thus creating a 3rd stage of assembly. The 3rd stage of assembly is planter apparatus 100, planter apparatus 200, planter apparatus 300, or planter apparatus 1400.

Figure 16:
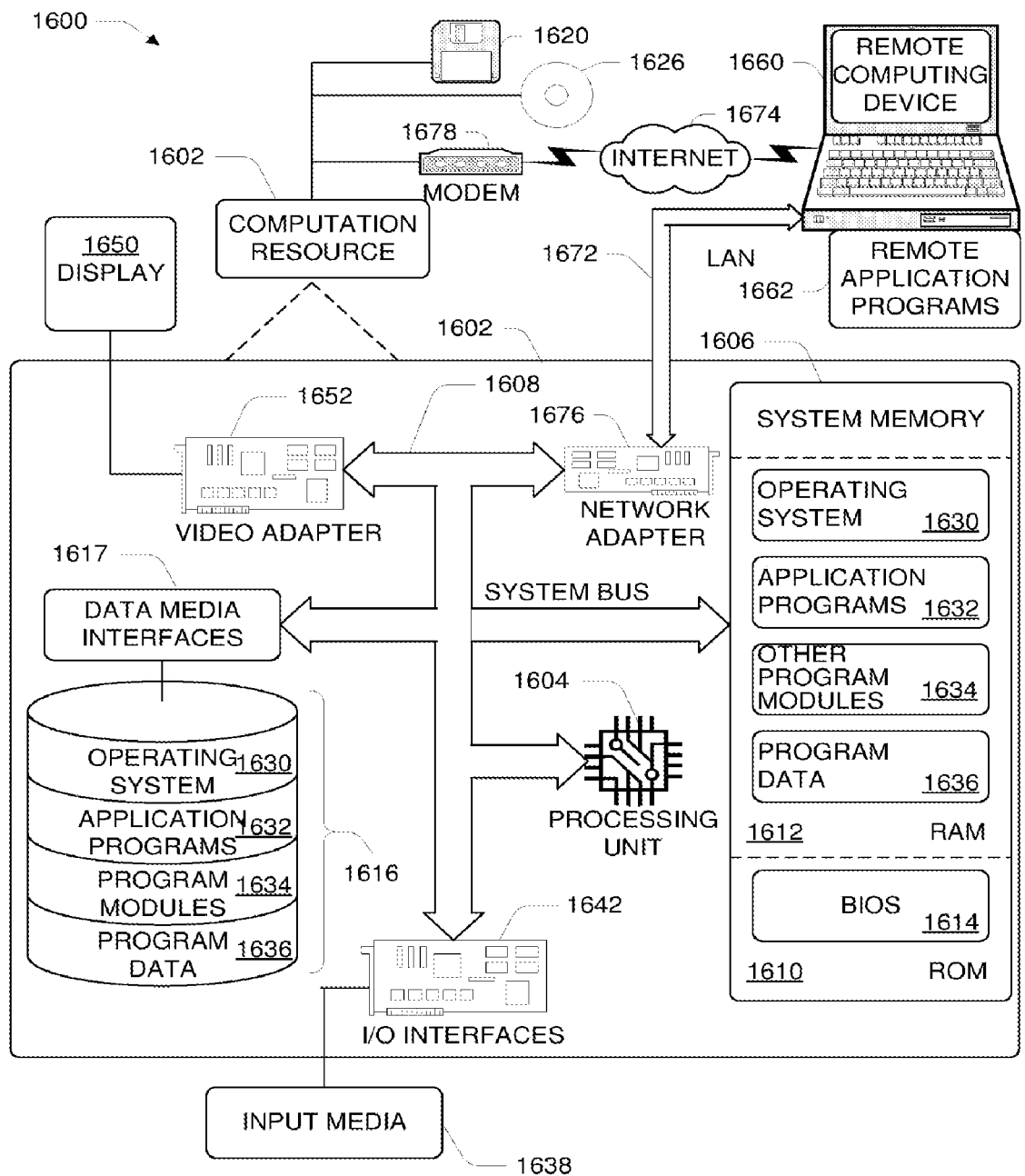
FIG. 16 is a block diagram of a hardware and operating environment, in accordance with embodiments described herein.

FIG. 16 is a block diagram of a hardware and operating environment 1600 in which different embodiments can be practiced. The description of FIG. 16 provides an overview of computer hardware and a suitable computing environment in conjunction with which some embodiments can be implemented to perform the method 1500 in FIG. 15 by an external robotic device to assemble the planter apparatus, either by welding the components together or snapping the components together. Some embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1602 includes a processor 1604, commercially available from Intel, Motorola, Cyrix, and others. Computer 1602 also includes random-access memory (RAM) 1612, read-only memory (ROM) 1610, and one or more mass storage devices 1616, and a system bus, that operatively couples various system components to the processor 1604. The memory 1612 and 1610, and mass storage devices 1616, are types of computer-accessible media. Mass storage devices 1616 are more specifically types of nonvolatile computer-accessible media and can include one or more hard disk drives, floppy disk drives, optical disk drives, and tape cartridge drives. The processor 1604 executes computer programs stored on the computer-accessible media.

Computer 1602 can be communicatively connected to the Internet 1674 via a communication device 1678. Internet 1674 connectivity is well known within the art. In some embodiments, a communication device 1678 is a modem that responds to communication drivers to connect to the Internet via what is known in the art as a "dial-up connection." In some embodiments, a communication device 1678 is an Ethernet® or similar hardware network card connected to a local-area network (LAN) that itself is connected to the Internet via what is known in the art as a "direct connection" (e.g., T1 line, etc.).

A user enters commands and information into the computer 1602 through input devices such as a keyboard or a pointing device. The keyboard permits entry of textual information into computer 1602, as known within the art, and some embodiments are not limited to any particular type of keyboard. A pointing device permits the control of the screen pointer provided by a graphical user interface (GUI) of operating systems such as versions of Microsoft Windows®. Some embodiments are not limited to any particular pointing device. Such pointing devices include mice, touch pads, trackballs, remote controls and point sticks. Other input devices can include a microphone, joystick, game pad, satellite dish, scanner, or the like.

In some embodiments, computer 1602 is operatively coupled to a display device 1650. Display device 1650 is connected to the system bus. Display device 1650 permits the display of information, including computer, video and other information, for viewing by a user of the computer. Some embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers provide audio output of signals. Speakers are also connected to the system bus.

Computer 1602 also includes an operating system 1630 that is stored on the computer-accessible media RAM 1612, ROM 1610, and mass storage device 1616, and is and executed by the processor 1604. Examples of operating systems include Microsoft Windows®, Apple MacOS®, Linux®, UNIX®. Examples are not limited to any particular operating system, however, and the construction and use of such operating systems are well known within the art.

Some embodiments of computer 1602 are not limited to any type of computer 1602. In varying embodiments, computer 1602 comprises a PC-compatible computer, a MacOS®-compatible computer, a Linux®-compatible computer, or a UNIX®-compatible computer. The construction and operation of such computers are well known within the art.

Computer 1602 can be operated using at least one operating system to provide a graphical user interface (GUI) including a user-controllable pointer. Computer 1602 can have at least one web browser application program executing within at least one operating system, to permit users of computer 1602 to access intranet or Internet world-wide-web pages as addressed by Universal Resource Locator (URL) addresses. Examples of browser application programs include Netscape Navigator® and Microsoft Internet Explorer®.

The computer 1602 can operate in a networked environment using logical connections to one or more remote computers, such as remote computer 1660. These logical connections are achieved by a communication device coupled to, or a part of, the computer 1602. Some embodiments are not limited to a particular type of communications device. The remote computer 1660 can be another computer, a server, a router, a network PC, a client, a peer device or other common network node. The logical connections depicted in FIG. 16 include a local-area network (LAN) 1672 and a wide-area network (WAN). Such networking environments are commonplace in offices, enterprise-wide computer networks, intranets and the Internet.

When used in a LAN-networking environment, the computer 1602 and remote computer 1660 are connected to the local network 1672 through network interfaces or adapters, which is one type of communications device. Remote computer 1660 also includes a network device. When used in a conventional WAN-networking environment, the computer 1602 and remote computer 1660 communicate with a WAN through modems (not shown). The modem, which can be internal or external, is connected to the system bus. In a networked environment, program modules depicted relative to the computer 1602, or portions thereof, can be stored in the remote computer 1660.

Computer 1602 also includes one or more power supplies. Each power supply can be a battery. Robotic assembly can be controlled through I/O interfaces 1642 or the Internet 1674.

As described in various embodiments herein, a planter apparatus is disclosed. Although specific embodiments are illustrated and described herein, it will be appreciated by those of ordinary skill in the art that any arrangement which is calculated to achieve the same purpose may be substituted for the specific embodiments shown. A technical effect of the planter apparatus is to temporarily or removeable hang or position a planter in a larger planter. This application is intended to cover any adaptations or variations. For example, although described in gardening terms, one of ordinary skill in the art will appreciate that embodiments can be made in industrial or any other embodiments that provide the required function.

One of skill in the art will readily appreciate that the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future planter devices, different materials, and new structures.

Some embodiments of a frame to hold a first planter in a second planter the frame include at least two hangers and at least two vertical members, each of the vertical members attached to at least one of the hangers on a first side of the vertical members, and a bottom attached to a second side of the each of the vertical members, wherein each of the hangers further comprise a hook that is curved away and downward from the first side of the vertical members, wherein each of the hooks circumscribe a mouth of the second planter; wherein the bottom further comprises a first ring along a horizontal plane and the bottom further comprises additional structure in the horizontal plane, where in the additional structure further comprises at least one cross-member, wherein the at least one cross-member further comprises two equilateral cross-members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring that further comprises second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of the first planter, wherein the interior geometric size and the interior shape of the frame is approximately the exterior geometric size and the exterior shape of the first planter.

Some embodiments of a frame includes at least two hangers and at least two vertical members, each of the vertical members attached to at least one of the hangers on a first side of the vertical members; and a bottom attached to a second side of the each of the vertical members, wherein the hangers further comprise hooks that are curved away and downward from the first side of the vertical members, wherein the hooks are semicircular, wherein the bottom further comprises a first ring along a horizontal plane and the bottom further comprises additional structure in the horizontal plane, wherein the additional structure further comprises at least one cross-member, wherein the at least one cross-member further comprises two equilateral cross members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring further comprises a second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of a first planter, wherein the interior geometric size and the interior shape of the frame is approximately the exterior geometric size and the exterior shape of the first planter.

Some embodiments of a frame include at least two vertical members, a bottom attached to a first side of the each of the vertical members; each of the vertical members forming a hanger on a distal side of the vertical members, thus forming at least two hangers; and wherein the hangers further comprise hooks that are curved away and downward from the first side of the vertical members, wherein the hooks are semicircular, wherein the bottom further comprises a first ring along a horizontal plane and the bottom further comprises additional structure in the horizontal plane, wherein the additional structure further comprises at least one cross-member, wherein the at least one cross-member further comprises two equilateral cross members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring further comprises a second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of a first planter, wherein the interior geometric size and the interior shape of the frame is approximately the exterior geometric size and the exterior shape of the first planter.

The terminology used in this application is meant to include all planters and decorative environments and alternate technologies which provide the same functionality as described herein.

Although specific features of the present embodiments may be shown in some drawings and not in others, this is for convenience only. In accordance with the principles of the disclosure, any feature of a drawing may be referenced and/or claimed in combination with any feature of any other drawing.

This written description uses examples to disclose the present embodiments, including the best mode, and also to enable any person skilled in the art to practice the present embodiments, including making and using the embodiments. The patentable scope of the present embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A frame to hold a first planter in a second planter, the frame comprising:
a pair of U-shaped members coupled to one another, wherein each respective U-shaped member comprises a first and second vertical member projecting upward from opposing ends of a cross-member to a first and second hanger, respectively, wherein each respective hanger is configured to be removably coupled to the second planter;
wherein the pair of U-shaped members are coupled to one another at a center position of the respective cross-members, forming an X-shaped bottom and an interior volume configured to receive the first planter; and
a removable first ring configured to extend circumferentially around the frame at a variable location selected from multiple height positions between (1) the first and second hanger and (2) the X-shaped bottom, and contact the first and second vertical member of each respective U-shaped member;
wherein the U-shaped members and the removable first ring are configured to engage with one another at the multiple positions with the variable location of the removable first ring at (1) a first location closer to the first and second hanger than the X-shaped bottom being configured to provide a smaller volume configured to receive the first planter, and dispose the first and second hanger closer together with one another to provide a smaller extension therebetween to removably couple to the second planter, and (2) a second location closer to the X-shaped bottom than the first and second hanger to provide a larger volume configured to receive the first planter, and dispose the first and second hanger farther apart from one another to provide a larger extension therebetween to removably couple to the second planter.

2. The frame of claim 1, wherein for each respective U-shaped member, the first and second hangers, the first and second vertical members, and the cross-member are integrally formed from a single piece of material.

3. The fame of claim 1, wherein for each respective U-shaped member, the first and second hangers are removably coupled to the respective first and second vertical members.

4. The frame of claim 1, wherein the first and second vertical members of each respective U-shaped member comprises a protrusion, wherein the protrusion is configured to receive the first ring.

5. The frame of claim 4, wherein the protrusion has a zigzag shape.

6. The frame of claim 1, wherein the first and second vertical members of each respective U-shaped member comprises two or more protrusions, wherein each respective protrusion is configured to receive the first ring, and wherein the two or more protrusions are spaced apart from one another.

7. The frame of claim 1, wherein the pair of U-shaped members are pivotably coupled to one another at the center position of their respective cross-members, whereby the pair of U-shaped members are configured to pivot about the center position such that the respective first and second vertical members of the pair of U-shaped members are configured to be variably spaced apart from one another.

8. The frame of claim 1, wherein the pair of U-shaped members includes a first U-shaped member and a second U-shaped member;
   wherein the hangers, the first and second vertical members, and the cross-member of the first U-shaped member collectively form a first vertical plane;
   wherein the hangers, the first and second vertical members, and the cross-member of the second U-shaped member collectively form a second vertical plane;
   wherein the first and second U-shaped members are pivotably coupled to one another and are configured to pivot about the center position of the respective cross-members of such that the first and second vertical planes are in an overlapping or non-overlapping position relative to one another.

9. The frame of claim 8, wherein the first and second vertical planes are in the overlapping position for shipping and storage and in the non-overlapping position for holding the first planter in the second planter.

10. A method of removably coupling a frame to a first planter, the frame configured to hold a second planter inside the first planter, the method comprising:
   providing the frame, comprising:
      a pair of U-shaped members coupled to one another, wherein each respective U-shaped member comprises a first and second vertical member projecting upward from opposing ends of a cross-member to a first and second hanger, respectively, wherein each respective hanger is configured to be removably coupled to a rim of the second planter,
      wherein the pair of U-shaped members are coupled to one another at a center position of the respective cross-members, forming an X-shaped bottom and an interior volume configured to receive the first planter; and
   pivotably rotating the pair of U-shaped members about the center position such that the respective first and second vertical members of the pair of U-shaped members are spaced apart from one another;
   inserting a removable first ring into the pair of U-shaped members, wherein the first ring extends circumferentially around the frame at a variable location selected from multiple height positions between (1) the first and second hanger and (2) the X-shaped bottom, and contact the first and second vertical member of each respective U-shaped member; and
   inserting the frame inside the first planter such that each respective hanger is removably coupled to the first planter;
   wherein the U-shaped members and the removable first ring are configured to engage with one another at the multiple positions with the variable location of the removable first ring at (1) a first location closer to the first and second hanger than the X-shaped bottom being configured to provide a smaller volume configured to receive the first planter, and dispose the first and second hanger closer together with one another to provide a smaller extension therebetween to removably couple to the second planter, and (2) a second location closer to the X-shaped bottom than the first and second hanger to provide a larger volume configured to receive the first planter, and dispose the first and second hanger farther apart from one another to provide a larger extension therebetween to removably couple to the second planter.

11. The method of claim 10, further comprising laying the second planter on the X-shaped bottom formed by the cross-members of the pair of U-shaped members.

12. The method of claim 10, wherein the first and second vertical member of each respective U-shaped member comprises one or more protrusions configured to receive the first ring.

13. The method of claim 10, wherein the first and second vertical member of each respective U-shaped member comprises two or more protrusions configured to receive the first ring, the two or more protrusions being spaced apart between the hanger of each respective first and second member and the respective cross-members.

14. The method of claim 13, wherein the inserting the first ring into the pair of U-shaped members comprises inserting the first ring into a protrusion of the two or more protrusions, whereby inserting the first ring into the protrusion defines an inverted and truncated conical volume configured to receive the first planter.

15. The method of claim 10, wherein each of the U-shaped members and the removeable first ring are comprised of metal wire.

16. The method of claim 10, wherein the removable first ring contacts the vertical members of the U-shaped members at a position between the cross-member and the first and second hangers of each respective vertical member.

17. The method of claim 10, further comprising a removable second ring.

18. The method of claim 17, wherein the removeable second ring is configured to extend circumferentially around the frame and contact the first and second vertical member of each respective U-shaped member at a position adjacent to the cross-member.

19. The method of claim 10, wherein the first and second vertical members each comprise a first protrusion between the cross-member and the first and second hangers of each respective vertical member, the first protrusion configured to receive the first ring.

20. The method of claim 19, wherein each of the U-shaped members comprises a second protrusion where the respective vertical members project upward from the corresponding cross-member, the second protrusion configured to receive a removable second ring.

* * * * *